(12) United States Patent
Russakoff

(10) Patent No.: US 7,907,768 B2
(45) Date of Patent: Mar. 15, 2011

(54) METHOD AND APPARATUS FOR PROBABILISTIC ATLAS BASED ON SHAPE MODELING TECHNIQUE

(75) Inventor: Daniel Russakoff, Mountain View, CA (US)

(73) Assignee: Fujifilm Corporation, Tokyo (JP)

( * ) Notice: Subject to any disclaimer, the term of this patent is extended or adjusted under 35 U.S.C. 154(b) by 1089 days.

(21) Appl. No.: 11/640,946

(22) Filed: Dec. 19, 2006

(65) Prior Publication Data

US 2008/0143724 A1 Jun. 19, 2008

(51) Int. Cl.
 G06K 9/00 (2006.01)
 G06K 9/62 (2006.01)
 G06K 9/74 (2006.01)
 G06T 11/20 (2006.01)
 A61B 6/04 (2006.01)

(52) U.S. Cl. ........ 382/132; 382/215; 382/228; 345/441; 378/37

(58) Field of Classification Search .................. 382/141, 382/132, 215, 228; 378/37; 345/441
 See application file for complete search history.

(56) References Cited

U.S. PATENT DOCUMENTS 5,574,799 A * 11/1996 Bankman et al. ............. 382/132
6,611,630 B1 * 8/2003 Miller et al. .................. 382/293
2005/0100243 A1 * 5/2005 Shum et al. ................... 382/276
2006/0269155 A1 * 11/2006 Tener et al. ................... 382/243
2007/0014457 A1 * 1/2007 Jolly et al. .................... 382/128

OTHER PUBLICATIONS

T.F. Cootes et al., "Active Shape Models—Their Training and Application" Computer Vision and Image Understanding, vol. 61, issue 1, Jan. 1995, pp. 38-59.
"Automated Segmentation of Digitized Mammograms" by U. Bick, M.L. Giger, R. A. Schmidt, R. M. Nishikawa, D. E. Wolverton, K. Doi, Academic Radiol. 2 (1995), p. 1-9.
G. Heitz et al., "Automatic Generation of Shape Models Using Nonrigid Registration with a Single Segmented Template Mesh", Proceedings of Vision, Modeling and Visualization, 2004.
D. Rueckert et al., Automatic Construction of 3-D Statistical Deformation Models of the Brain Using Nonrigid Registration, IEEE Transactions on Medical Imaging, 22(8), pp. 1014-1025, Aug. 2003.

* cited by examiner

Primary Examiner — Kathleen S Yuan
(74) Attorney, Agent, or Firm — Birch, Stewart, Kolasch & Birch, LLP

(57) ABSTRACT

Methods and an apparatus process images. The method according to one embodiment accesses digital image data representing a plurality of objects with a plurality of features; generates a shape model for shapes of the plurality of objects, the step of generating a shape model including generating a baseline object by aligning the plurality of objects, and determining deformation modes to describe shape deformations between shapes of the plurality of objects and the baseline object; performs shape registration for the plurality of objects by fitting shapes of the plurality of objects using combinations of the deformation modes, to obtain registered shapes; and generates a probabilistic atlas by mapping the plurality of features from the plurality of objects to the baseline object, using the registered shapes for the plurality of objects.

22 Claims, 17 Drawing Sheets

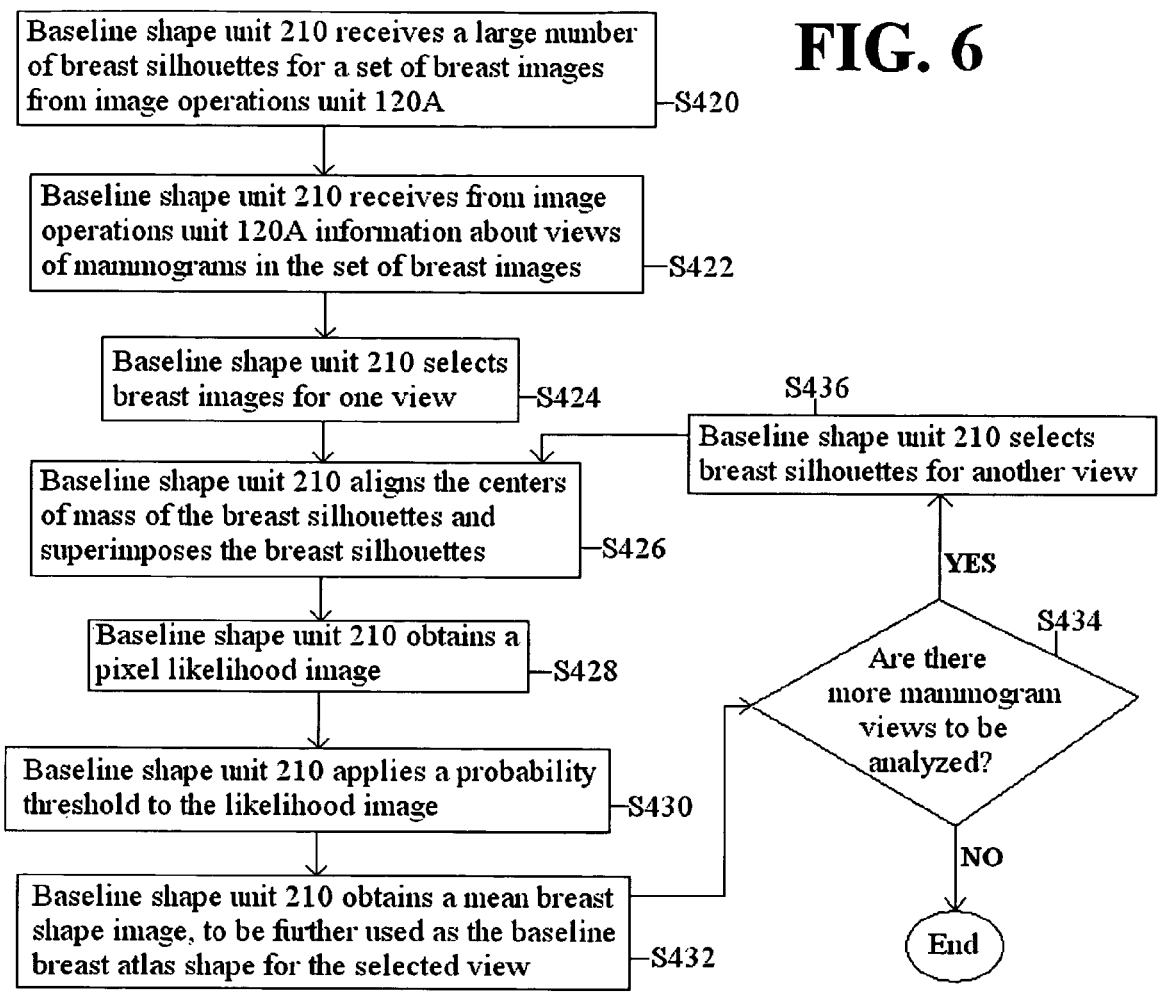

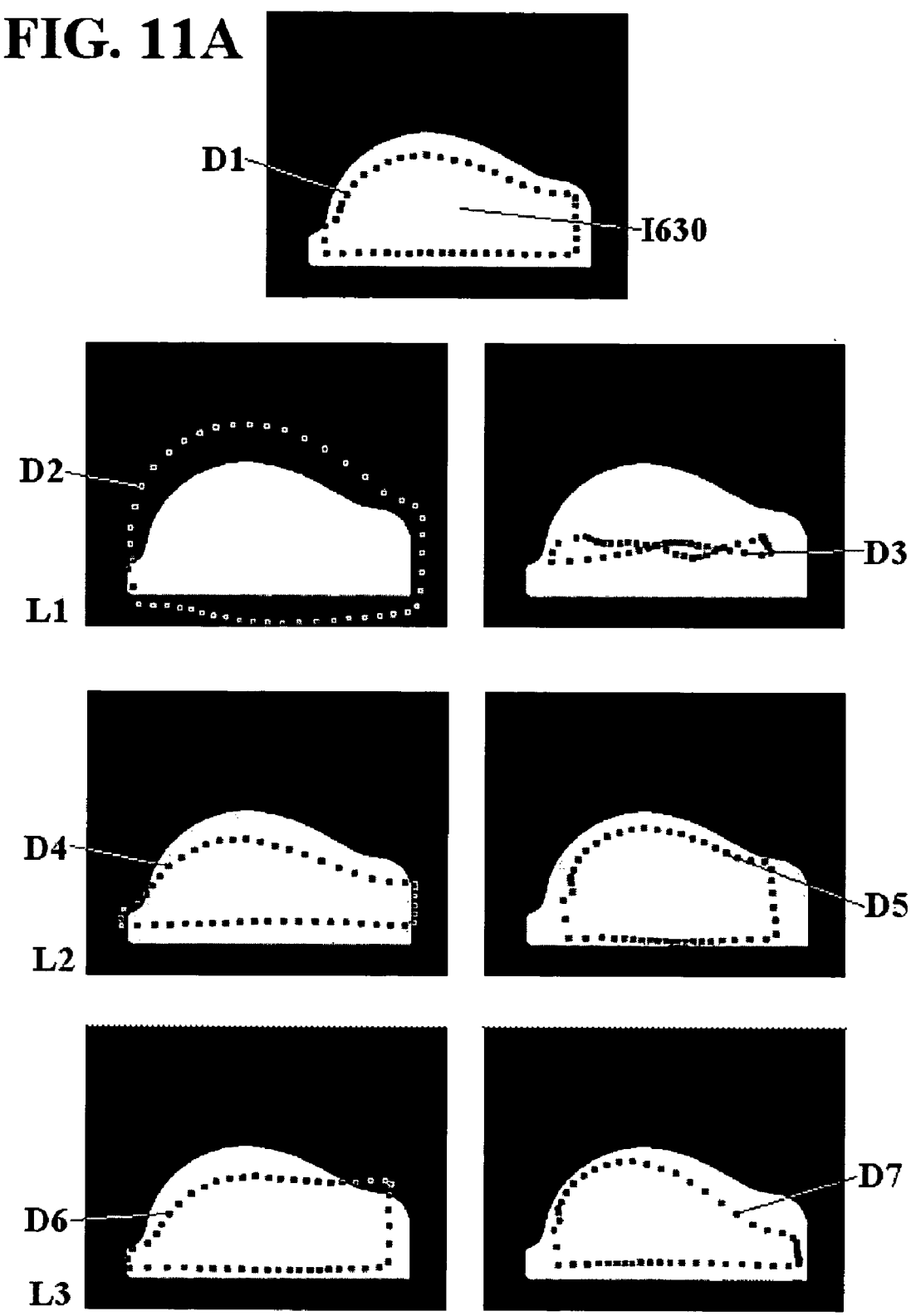

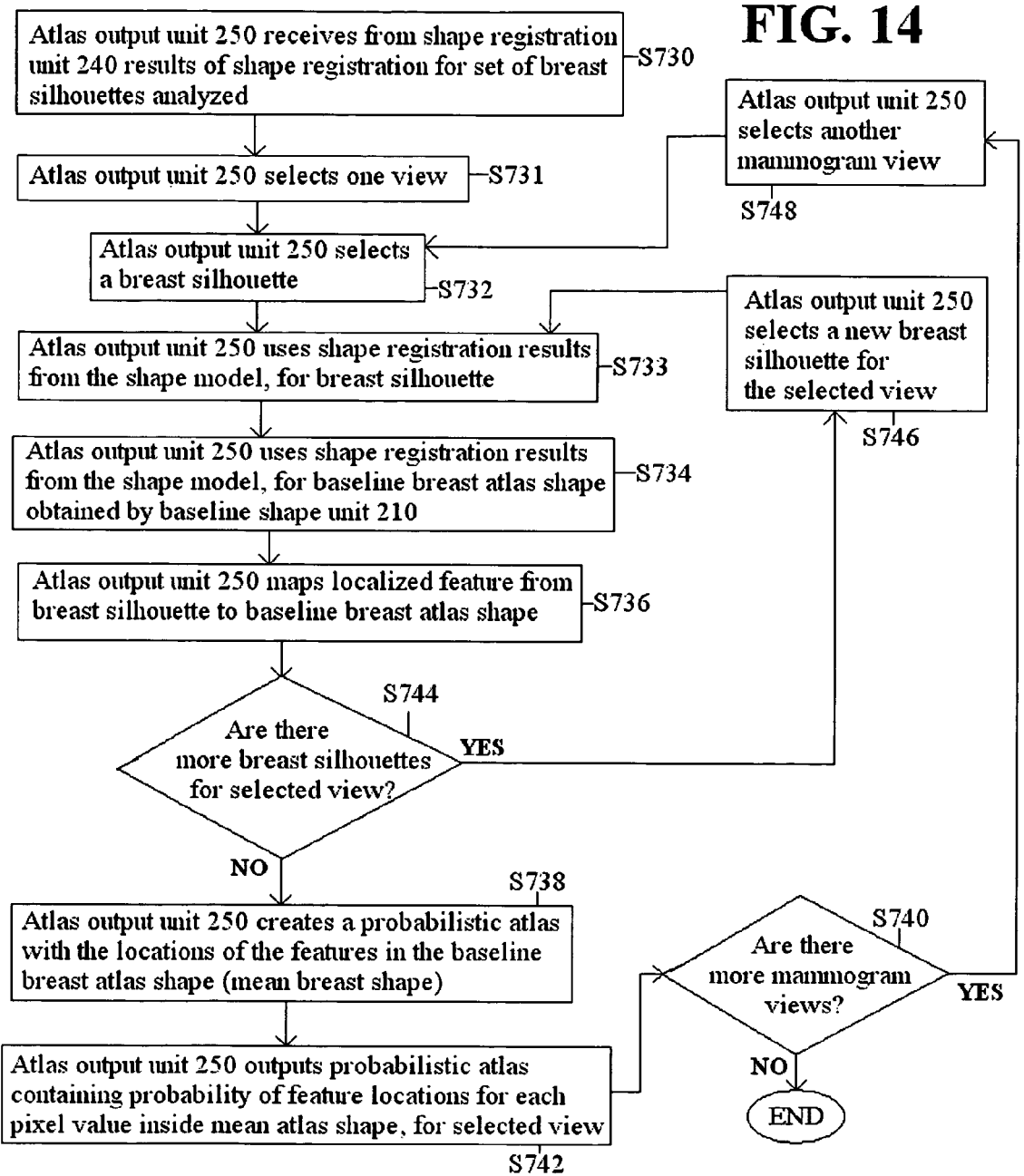

METHOD AND APPARATUS FOR PROBABILISTIC ATLAS BASED ON SHAPE MODELING TECHNIQUE

CROSS REFERENCE TO RELATED APPLICATIONS

This non-provisional application is related to co-pending non-provisional applications titled "Method and Apparatus of Using Probabilistic Atlas for Cancer Detection" and "Method and Apparatus of Using Probabilistic Atlas for Feature Removal/Positioning" filed concurrently herewith, the entire contents of which are hereby incorporated by reference.

BACKGROUND OF THE INVENTION

1. Field of the Invention

The present invention relates to a digital image processing technique, and more particularly to a method and apparatus for processing anatomical images and generating an atlas relating to anatomical features in anatomical images.

2. Description of the Related Art

Identification of abnormal structures in medical images is an important application useful in many fields of medicine. For example, identification of cancer structures in mammograms is important and useful for prompt treatment and prognosis.

Reliable anatomical structure detection, however, is difficult to achieve because of variations in anatomical shapes and medical imaging conditions. Such variations include: 1) anatomical shape variation between similar anatomical parts of various people or of the same person; 2) lighting variations for medical images taken at different times; 3) pose and view changes in medical images; 4) change in anatomical structures due to aging of people; etc. Such medical imaging variations pose challenges for both manual identification and computer-aided detection of abnormal structures in medical images.

Disclosed embodiments of this application address these and other issues by using a method and an apparatus for generating a probabilistic atlas of features using a shape modeling technique for anatomical shapes. The method and apparatus generate a mean shape representative of a class of anatomical shapes, and then calculate a deformation field that describes variations of anatomical shapes with respect to the mean shape. The method and apparatus generate a probabilistic atlas as a map of the likelihood of abnormal structures on the mean shape. The method and apparatus can create a probabilistic atlas for other types of structures besides abnormal structures in medical images. The method and apparatus can be applied to other types of images besides medical images, to generate a probabilistic atlas for other types of features besides anatomical structures.

SUMMARY OF THE INVENTION

The present invention is directed to methods and an apparatus for processing images. According to a first aspect of the present invention, an image processing method comprises: accessing digital image data representing a plurality of objects with a plurality of features; generating a shape model for shapes of the plurality of objects, the step of generating a shape model including generating a baseline object by aligning the plurality of objects, and determining deformation modes to describe shape deformations between shapes of the plurality of objects and the baseline object; performing shape registration for the plurality of objects by fitting shapes of the plurality of objects using combinations of the deformation modes, to obtain registered shapes; and generating a probabilistic atlas by mapping the plurality of features from the plurality of objects to the baseline object, using the registered shapes for the plurality of objects.

According to a second aspect of the present invention, an image processing apparatus comprises: an image data input unit for providing digital image data representing a plurality of objects with a plurality of features; a shape model unit for generating a shape model for shapes of the plurality of objects, the shape model unit generating a shape model by generating a baseline object by aligning the plurality of objects, and determining deformation modes to describe shape deformations between shapes of the plurality of objects and the baseline object; a shape registration unit for performing shape registration for the plurality of objects by fitting shapes of the plurality of objects using combinations of the deformation modes, to obtain registered shapes; and a probabilistic atlas unit for generating a probabilistic atlas by mapping the plurality of features from the plurality of objects to the baseline object, using the registered shapes for the plurality of objects.

According to a third aspect of the present invention, an image processing method comprises: accessing digital image data representing a plurality of objects with a plurality of features; generating a shape model for shapes of the plurality of objects, the step of generating a shape model including generating a baseline object using at least one object from the plurality of objects, and determining deformation modes to describe shape deformations between shapes of the plurality of objects and the baseline object; performing shape registration for the plurality of objects by fitting shapes of the plurality of objects using combinations of the deformation modes, to obtain registered shapes; and generating a probabilistic atlas by mapping the plurality of features from the plurality of objects to the baseline object, using the registered shapes for the plurality of objects.

BRIEF DESCRIPTION OF THE DRAWINGS

Further aspects and advantages of the present invention will become apparent upon reading the following detailed description in conjunction with the accompanying drawings, in which:

FIG. 6 is a flow diagram illustrating operations performed by a baseline shape unit included in an image processing unit for generating a probabilistic atlas using shape modeling according to an embodiment of the present invention illustrated in FIG. 3;

FIG. 11A illustrates exemplary deformation modes obtained by a deformation analysis unit according to an embodiment of the present invention illustrated in FIG. 10;

FIG. 14 is a flow diagram illustrating operations performed by an atlas output unit included in an image processing unit for generating a probabilistic atlas using shape modeling according to an embodiment of the present invention illustrated in FIG. 3;

DETAILED DESCRIPTION

Figure 1:
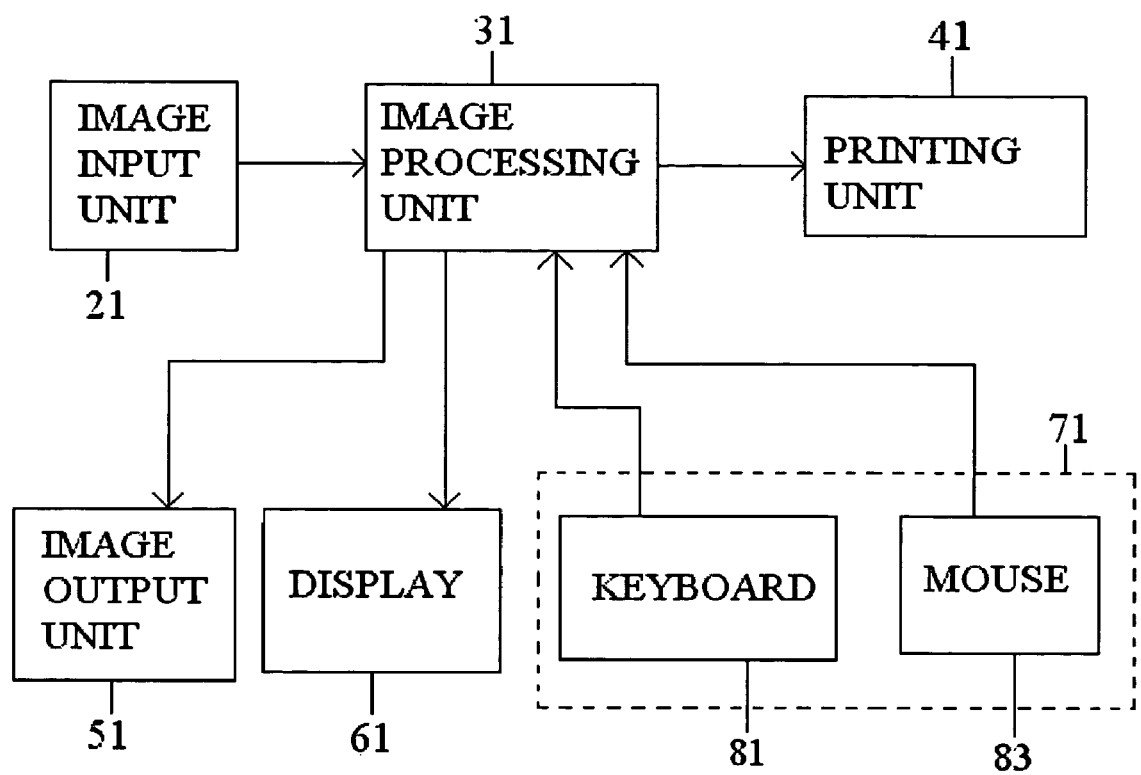
FIG. 1 is a general block diagram of a system including an image processing unit for generating a probabilistic atlas using shape modeling according to an embodiment of the present invention.

Aspects of the invention are more specifically set forth in the accompanying description with reference to the appended figures. FIG. 1 is a general block diagram of a system including an image processing unit for generating a probabilistic atlas using shape modeling according to an embodiment of the present invention. The system 90 illustrated in FIG. 1 includes the following components: an image input unit 21; an image processing unit 31; a display 61; an image output unit 51; a user input unit 71; and a printing unit 41. Operation of the system 90 in FIG. 1 will become apparent from the following discussion.

The image input unit 21 provides digital image data. Digital image data may be medical images such as mammograms, chest X-rays, brain scans, etc. Digital image data may also be images of people, images of various objects, etc. Image input unit 21 may be one or more of any number of devices providing digital image data derived from a radiological film, a diagnostic image, a digital system, etc. Such an input device may be, for example, a scanner for scanning images recorded on a film; a digital camera; a digital mammography machine; a recording medium such as a CD-R, a floppy disk, a USB drive, etc.; a database system which stores images; a network connection; an image processing system that outputs digital data, such as a computer application that processes images; etc.

The image processing unit 31 receives digital image data from the image input unit 21 and generates a probabilistic atlas using shape modeling techniques in a manner discussed in detail below. A user, e.g., a radiology specialist at a medical facility, may view the output of image processing unit 31, via display 61 and may input commands to the image processing unit 31 via the user input unit 71. In the embodiment illustrated in FIG. 1, the user input unit 71 includes a keyboard 81 and a mouse 83, but other conventional input devices could also be used.

In addition to generating a probabilistic atlas using shape modeling techniques in accordance with embodiments of the present invention, the image processing unit 31 may perform additional image processing functions in accordance with commands received from the user input unit 71. The printing unit 41 receives the output of the image processing unit 31 and generates a hard copy of the processed image data. In addition or as an alternative to generating a hard copy of the output of the image processing unit 31, the processed image data may be returned as an image file, e.g., via a portable recording medium or via a network (not shown). The output of image processing unit 31 may also be sent to image output unit 51 that performs further operations on image data for various purposes. The image output unit 51 may be a module that performs further processing of the image data; a database that collects and compares images; a database that stores and uses atlas results received from image processing unit 31; etc.

Figure 2:
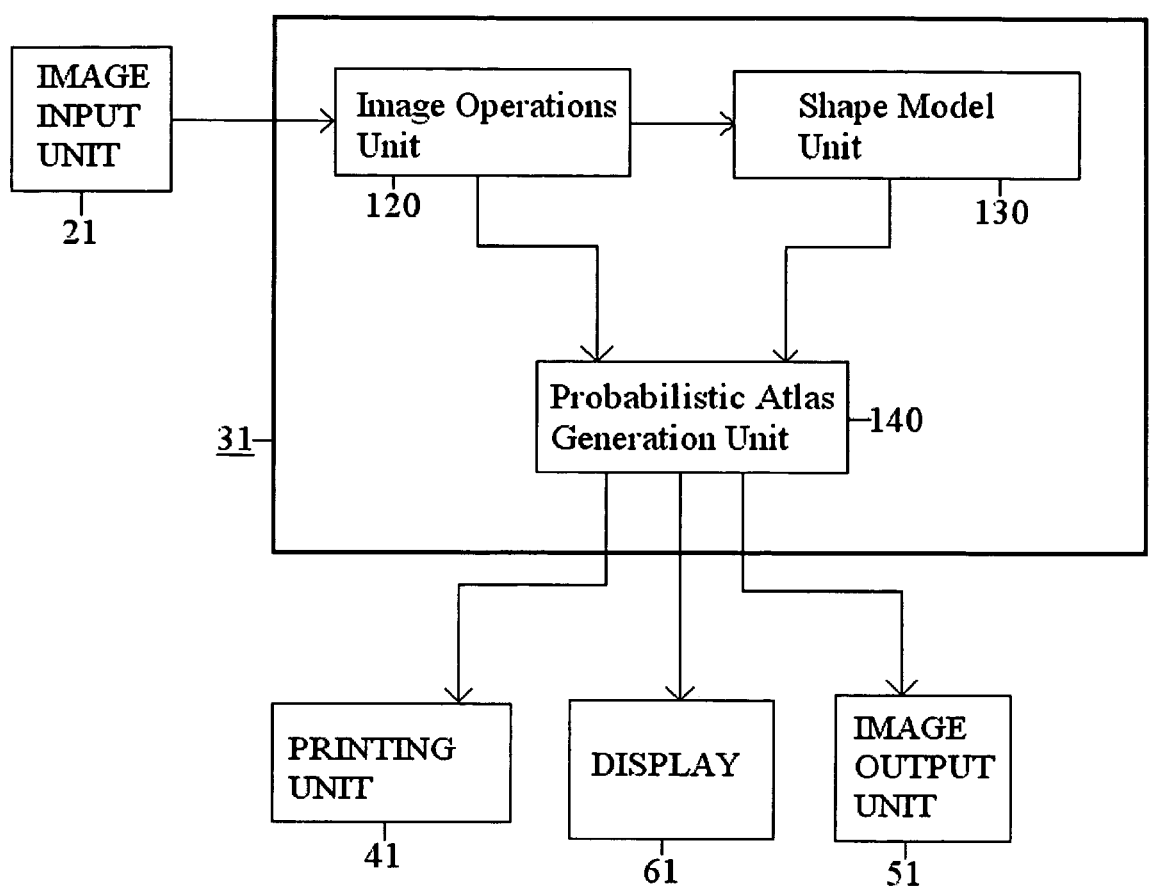
FIG. 2 is a block diagram illustrating in more detail aspects of the image processing unit for generating a probabilistic atlas using shape modeling according to an embodiment of the present invention.

FIG. 2 is a block diagram illustrating in more detail aspects of the image processing unit 31 for generating a probabilistic atlas using shape modeling according to an embodiment of the present invention.

Active Shape Models (ASMS) were first introduced by T. F. Cootes, C. J. Taylor, D. H. Cooper, J. Graham, in "Active Shape Models-Their Training and Application" Computer Vision and Image Understanding, vol. 61, issue 1, January 1995, pg. 38-59, the entire contents of which are hereby incorporated by reference.

The current application is connected to the field of shape modeling. The current application creates shape models for anatomical shapes, and uses the shape models to create an atlas with probabilities for presence of features in anatomical objects.

As shown in FIG. 2, the image processing unit 31 according to this embodiment includes: an image operations unit 120; a shape model unit 130; and a probabilistic atlas generation unit 140. Although the various components of FIG. 2 are illustrated as discrete elements, such an illustration is for ease of explanation and it should be recognized that certain operations of the various components may be performed by the same physical device, e.g., by one or more microprocessors.

Generally, the arrangement of elements for the image processing unit 31 illustrated in FIG. 2 performs preprocessing and preparation of digital image data, generation of a shape model for objects in the digital image data, and generation of a probabilistic atlas for features found in objects in the digital image data. Operation of image processing unit 31 will be next described in the context of mammography images, for generation of a probabilistic atlas for features in mammography images. However, the principles of the current invention apply equally to other areas of image processing, and to generation of probabilistic atlases for features in other types of objects in digital image data.

Image operations unit 120 receives a set of breast images from image input unit 21 and may perform preprocessing and preparation operations on the breast images. Preprocessing and preparation operations performed by image operations unit 120 may include resizing, cropping, compression, color correction, etc., that change size and/or appearance of the breast image. Image operations unit 120 may also store or extract information about breast images, such as view of mammograms.

Image operations unit 120 sends the preprocessed breast images to shape model unit 130, which generates a model describing variability of breast shapes between breast images, and how shape varies from breast to breast.

Shape model unit 130 sends results of the shape model to the probabilistic atlas generation unit 140. Probabilistic atlas generation unit 140 uses the shape model on sets of breast images to represent shapes of breasts in breast images. Probabilistic atlas generation unit 140 maps features of breasts from breast images onto a baseline breast image, to obtain an atlas for probabilities of features in breast images. Features analyzed by probabilistic atlas generation unit 140 may be cancer masses in breasts, benign formations in breasts, breast vessel areas, etc. Probabilistic atlas generation unit 140 outputs an atlas for probabilities of features in breast images. The output of probabilistic atlas generation unit 140 may be sent to image output unit 51, printing unit 41, and/or display 61. Operation of the components included in the image processing unit 31 illustrated in FIG. 2 will be next described with reference to FIGS. 3-15C.

Image operations unit 120, shape model unit 130, and probabilistic atlas generation unit 140 are software systems/applications. Image operations unit 120, shape model unit 130, and probabilistic atlas generation unit 140 may also be purpose built hardware such as FPGA, ASIC, etc.

Figure 3:
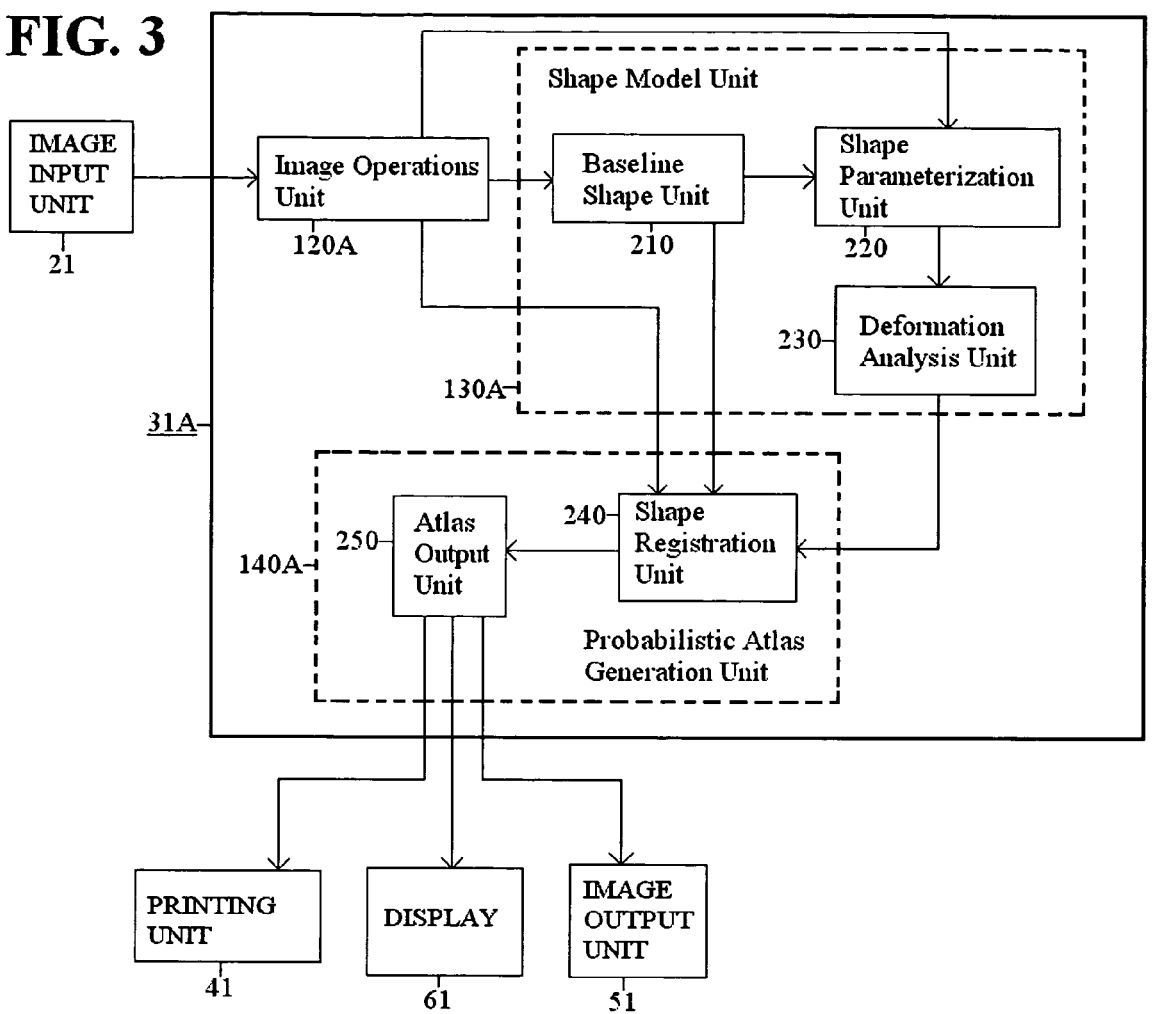
FIG. 3 is a block diagram of an exemplary image processing unit for generating a probabilistic atlas using shape modeling according to an embodiment of the present invention illustrated in FIG. 2.

FIG. 3 is a block diagram of an exemplary image processing unit 31A for generating a probabilistic atlas using shape modeling according to an embodiment of the present invention illustrated in FIG. 2. As shown in FIG. 3, image processing unit 31A includes: an image operations unit 120A; a baseline shape unit 210; a shape parameterization unit 220; a deformation analysis unit 230; a shape registration unit 240; and an atlas output unit 250. Baseline shape unit 210, shape parameterization unit 220, and deformation analysis unit 230 are included in a shape model unit 130A. Shape registration unit 240 and atlas output unit 250 are included in a probabilistic atlas generation unit 140A.

Image operations unit 120A performs preprocessing and preparation of one or more sets of breast images. Baseline shape unit 210 generates a baseline breast shape from sets of breast images. Shape parameterization unit 220 warps breast images onto the generated baseline breast shape. Deformation analysis unit 230 analyzes deformations of breast shapes in images from the generated baseline breast shape, to obtain a shape model for breast shapes. Shape registration unit 240 represents shapes of breasts in breast images using the shape model from shape model unit 130A. Atlas output unit 250 maps features of breasts from breast images onto the baseline breast image, and obtains an atlas for probabilities of features in breast images. Features analyzed by probabilistic atlas generation unit 140A may be cancer masses in breasts, benign formations in breasts, breast vessel areas, etc. Atlas output unit 250 outputs an atlas for probabilities of features in breast images. Such atlas output results may be sent to image output unit 51, printing unit 41, and/or display 61.

Image operations unit 120A, baseline shape unit 210, shape parameterization unit 220, deformation analysis unit 230, shape registration unit 240, and atlas output unit 250 may be implemented using software and/or hardware.

Figure 4:
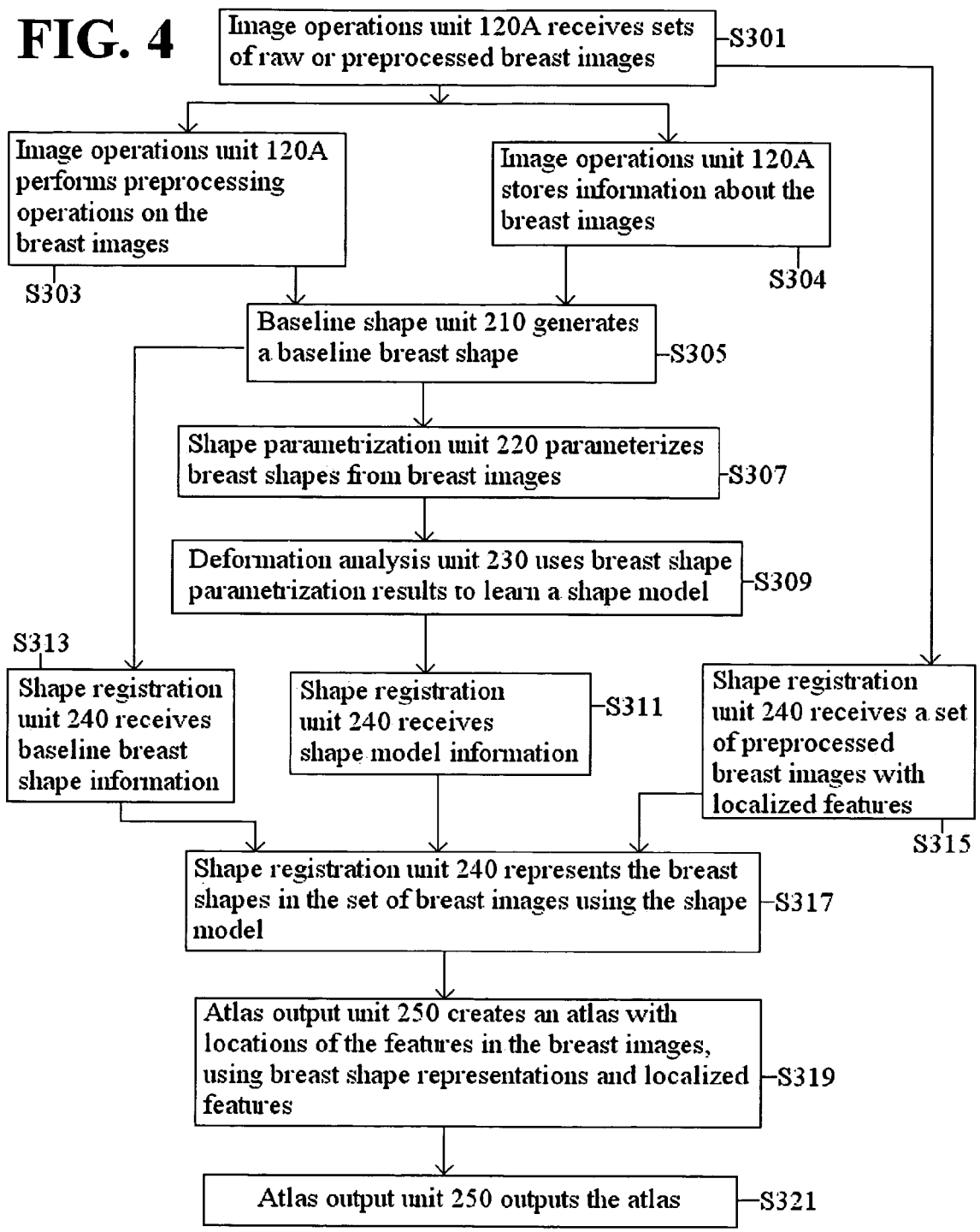
FIG. 4 is a flow diagram illustrating operations performed by an image processing unit for generating a probabilistic atlas using shape modeling according to an embodiment of the present invention illustrated in FIG. 3.

FIG. 4 is a flow diagram illustrating operations performed by an image processing unit 31A for generating a probabilistic atlas using shape modeling according to an embodiment of the present invention illustrated in FIG. 3. Image operations unit 120A receives one or more sets of raw or preprocessed breast images from image input unit 21 (S301). The sets of breast images may be retrieved by image operations unit 120A from, for example, a database of breast images from image input unit 21. Such a database of breast images may include a large number of breast images, such as, for example, tens or hundreds of mammograms. Image operations unit 120A performs preprocessing operations on the breast images (S303). Preprocessing operations may include resizing, cropping, compression, color correction, etc. Image operations unit 120A also stores information about the breast images, such as information about the views of the mammograms (S304). Examples of mammogram views are MLL (medio-lateral left), MLR (medio-lateral right), CCL (cranio-caudal left), CCR (cranio-caudal right), RCC, LRR, LMLO (left medio-lateral oblique), and RMLO (right medio-lateral oblique).

Baseline shape unit 210 receives the preprocessed breast images from image operations unit 120A, and generates a baseline breast shape (S305). The baseline breast shape may be, for example, a mean breast shape obtained from the set of breast images. The baseline breast shape is also called a baseline breast atlas shape in the current application.

Shape parameterization unit 220 receives results for the baseline breast shape, and parameterizes breast shapes from the breast images, to evaluate variation of the breast shapes from the baseline breast shape (S307). Deformation analysis unit 230 uses breast shape parametrization results to learn a shape model that describes how shape varies from breast to breast (S309).

Shape registration unit 240 receives the shape model information from deformation analysis unit 230 (S311), the baseline breast shape information from baseline shape unit 210 (S313), and a set of preprocessed breast images from image operations unit 120A (S315). The set of breast images may be the same set used by baseline shape unit 210 to generate a baseline breast shape, or a new set of breast images. The set of breast images have features that have been previously localized. For example, the set of breast images may exhibit features such as tumor formations that were previously localized by, for example, a radiology specialist. Shape registration unit 240 represents the breast shapes in the set of breast images using the shape model (S317). Using the breast shape representations for breast images and the localized features in the breast images, atlas output unit 250 creates an atlas with locations of the features in the breast images (S319). The atlas may, for example, determine and store locations of the features corresponding to the baseline breast shape.

Atlas output unit 250 may output the atlas results to image output unit 51, printing unit 41, and/or display 61.

Figure 5:
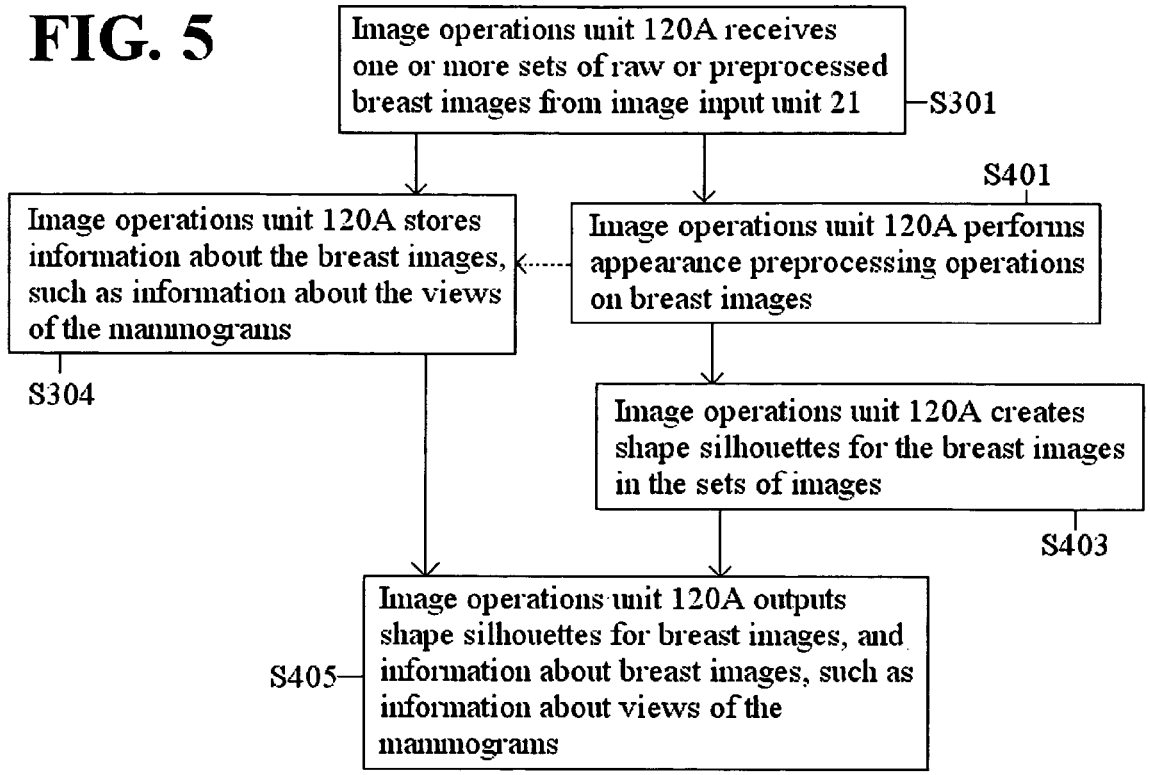
FIG. 5 is a flow diagram illustrating operations performed by an image operations unit included in an image processing unit for generating a probabilistic atlas using shape modeling according to an embodiment of the present invention illustrated in FIG. 3.

FIG. 5 is a flow diagram illustrating operations performed by an image operations unit 120A included in an image processing unit 31A for generating a probabilistic atlas using shape modeling according to an embodiment of the present invention illustrated in FIG. 3. Image operations unit 120A receives one or more sets of raw or preprocessed breast images from image input unit 21 (S301). The sets of breast images are training images that may be retrieved by image operations unit 120A from, for example, a database of breast images from image input unit 21. Such a database of breast images may include a large number of breast images, such as, for example, tens or hundreds of mammograms. Image operations unit 120A may perform appearance preprocessing operations on the breast images (S401). Preprocessing operations may include resizing, cropping, compression, color correction, etc.

Image operations unit 120A creates breast shape silhouettes for the breast images in the sets of images (S403). The shape silhouettes are also called breast mask images in the current application. Shape silhouettes include breast pixels, and may be created by extracting breast borders for the breasts shown in breast images. Image operations unit 120A may create shape silhouettes by extracting breast borders using methods described in the US patent application titled "Method and Apparatus for Breast Border Detection", application Ser. No. 11/366,495, by Daniel Russakoff and Akira Hasegawa, filed on Mar. 3, 2006, the entire contents of which are hereby incorporated by reference. With the techniques described in the "Method and Apparatus for Breast Border Detection" application, pixels in breast images are represented in a multi-dimensional space, such as a 4-dimensional space with x-locations of pixels, y-locations of pixels, the intensity value of pixels, and the distance of pixels to a reference point. K-means clustering of pixels is run in the multi-dimensional space, to obtain clusters for breast images. Cluster merging and connected components analysis are then run using relative intensity measures, brightness pixel values, and cluster size, to identify the cluster corresponding to the breast in each breast image. A set of pixels, or a mask, containing breast pixels, is obtained for each breast image. The set of pixels for a breast in a breast image forms the shape silhouette/breast mask for that breast image.

Image operations unit 120A may also segment the breast area from the background in a mammogram, to create shape silhouettes, using methods described in the publication "Automated Segmentation of Digitized Mammograms" by Wirth, A. and Stapinski, M., Academic Radiology 2 (1995), p. 1-9, the entire contents of which are hereby incorporated by reference.

Other breast border detection techniques can also be used by image operations unit 120A, to obtain shape silhouettes for breast images.

Image operations unit 120A also stores information about the breast images, such as information about the views of the mammograms (S304). Examples of mammogram views are MLL, MLR, CCL, CCR.

Image operations unit 120A then outputs breast shape silhouettes for breast images, and information about the breast images, such as information about views of the mammograms (S405).

FIG. 6 is a flow diagram illustrating operations performed by a baseline shape unit 210 included in an image processing unit 31A for generating a probabilistic atlas using shape modeling according to an embodiment of the present invention illustrated in FIG. 3. Baseline shape unit 210 receives a large number of breast silhouettes for a set of breast images from image operations unit 120A (S420). Baseline shape unit 210 also receives from image operations unit 120A information about views of the mammograms in the set of breast images (S422). Baseline shape unit 210 next selects breast images for one view (S424). Baseline shape unit 210 may, for example, select breast images for the CC or the ML view.

Baseline shape unit 210 generates a baseline breast atlas shape. In one embodiment, the baseline breast atlas shape is a mean breast shape obtained by bringing all breasts from the selected view into affine alignment. Since scaling and rotation are already taken care of by the mammogram image acquisition process, affine alignment is performed using a 2D registration. A 2D rigid registration is performed by aligning the centers of mass of the breast silhouettes (S426). The center of mass of each breast silhouette may be generated using all the breast pixels in that breast silhouette. The breast silhouettes are superimposed over each other, with their centers of mass aligned. The alignment of the centers of mass of breast silhouettes results in a probabilistic map, or a likelihood image, in which the brighter a pixel is, the more likely it is for the pixel to appear in a breast silhouette (S428). In the likelihood image, values are assigned to pixels' intensities based on numbers of breasts in which the pixels appear.

A probability threshold of 0.05 is applied to the likelihood image (S430), to obtain a mean breast shape image (S432). In one exemplary implementation, a probability threshold of 0.05 was applied to the likelihood image, hence the mean breast shape image obtained in this case represents the set of pixels that have a 95% or more chance of appearing in a breast silhouette.

The mean breast shape will be used further as the baseline breast atlas shape ($B_a$) for the selected view (S432).

Baseline shape unit 210 may perform steps S426, S428, S430 and S432 for additional mammogram views, such as MLL, MLR, CCL, CCR views (S434, S436), etc., to obtain baseline breast atlas shapes for the additional mammogram views analyzed.

One baseline breast atlas shape may be obtained for mammograms that are pairs of mirror images. For example, the MLL view is the mirror image of the MLR view about the vertical axis; hence one baseline breast atlas shape can be obtained from MLL and MLR view mammograms. Similarly, the CCL view is the mirror image of the CCR view about the vertical axis; hence one baseline breast atlas shape can be obtained from CCL and CCR view mammograms.

In other embodiments, a baseline breast atlas shape for a mammogram view may be obtained by a different alignment of breast images, or may be a randomly chosen breast image from a set of training breast images for that mammogram view.

Figure 7A:
FIG. 7A illustrates an exemplary likelihood image for the MLL view obtained by a baseline shape unit according to an embodiment of the present invention illustrated in FIG. 6.

FIG. 7A illustrates an exemplary likelihood image for the MLL view obtained by a baseline shape unit 210 according to an embodiment of the present invention illustrated in FIG. 6. The likelihood image in FIG. 7A was obtained by baseline shape unit 210 in step S428 in FIG. 6. The likelihood image includes pixels of variable brightness. The brighter a pixel is, the more likely it is for the pixel to appear in a breast silhouette for the MLL view.

Figure 7B:
FIG. 7B illustrates an exemplary baseline breast atlas shape for the ML view obtained by a baseline shape unit according to an embodiment of the present invention illustrated in FIG. 6.

FIG. 7B illustrates an exemplary baseline breast atlas shape for the ML view obtained by a baseline shape unit 210 according to an embodiment of the present invention illustrated in FIG. 6. The baseline breast atlas shape in FIG. 7B was obtained from the likelihood image in FIG. 7A, in step S432 in FIG. 6, by applying a threshold of 0.05 to the likelihood image of FIG. 7A. The baseline breast atlas shape in FIG. 7B represents the set of pixels that have a 95% or more chance of appearing in a breast silhouette in the ML view.

Figure 8:
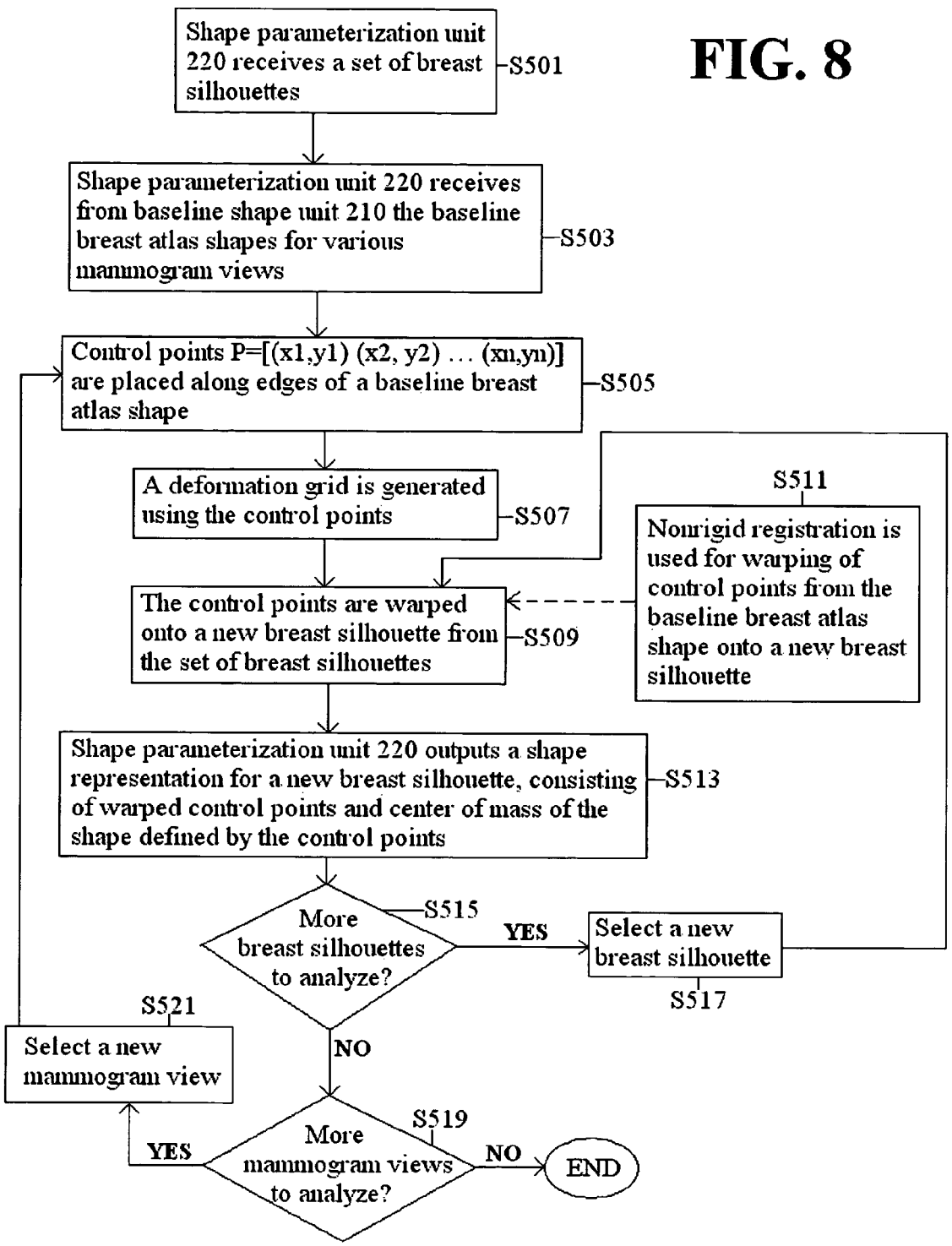
FIG. 8 is a flow diagram illustrating operations performed by a shape parameterization unit included in an image processing unit for generating a probabilistic atlas using shape modeling according to an embodiment of the present invention illustrated in FIG. 3.

FIG. 8 is a flow diagram illustrating operations performed by a shape parameterization unit 220 included in an image processing unit 31A for generating a probabilistic atlas using shape modeling according to an embodiment of the present invention illustrated in FIG. 3. The flow diagram in FIG. 8 describes exemplary details of step S307 from FIG. 4. The flow diagram in FIG. 8 illustrates warping of breast silhouettes onto a baseline breast atlas shape (mean breast shape), to define parameterization of shape.

Shape parameterization unit 220 receives a set of breast silhouettes (S501). The set of breast silhouettes may be the breast silhouettes that were used by baseline shape unit 210 to obtain baseline breast atlas shapes for various mammogram views, or it may be a new set of breast silhouettes. Shape parameterization unit 220 also receives from baseline shape unit 210 the baseline breast atlas shapes for various mammogram views (S503).

Let $B_a$ be a baseline breast atlas shape (mean breast shape) for a selected mammogram view. $B_{new}$ is a new breast silhouette from the set of breast silhouettes used by baseline shape unit 210.

Shape parameterization unit 220 next performs shape parameterization of breast silhouettes from the set of breast silhouettes used by baseline shape unit 210. Shape parameterization unit 220 may use shape parameterization techniques adapted from "Automatic Generation of Shape Models Using Nonrigid Registration with a Single Segmented Template Mesh" by G. Heitz, T. Rohlfing and C. Maurer, Proceedings of Vision, Modeling and Visualization, 2004, the entire contents of which are hereby incorporated by reference. Control points, or landmarks, $P=[(x_1, y_1) (x_2, y_2) \ldots (x_n, y_n)]$ are placed along the edges of the baseline breast atlas shape $B_a$ (S505). The landmarks may be manually placed on the baseline breast atlas shape $B_a$. A deformation grid is generated using the control points/landmarks (S507). Using the deformation grid, the control points are warped onto a new breast silhouette $B_{new}$ from the set of breast silhouettes used by baseline shape unit 210 (S509). Corresponding control points $P_{new}$ on the breast silhouette $B_{new}$ are obtained from control points $P=[(x_1, y_1) (x_2, y_2) \ldots (x_n, y_n)]$ by warping. Shape information for breast silhouette $B_{new}$ is then given by the corresponding control points $P_{new}$ together with the center of mass $C_{new}$ of the shape defined by the control points $P_{new}$.

Warping of control points $P=[(x_1, y_1) (x_2, y_2) \ldots (x_n, y_n)]$ from the baseline breast atlas shape $B_a$ onto new breast silhouettes $B_{new}$ may be performed by non-rigid registration (S511). For each new breast silhouette $B_{new}$ from the set of breast silhouettes used by baseline shape unit 210, shape parameterization unit 220 performs a non-rigid registration between $B_{new}$ and $B_a$. Non-rigid registration can be performed in a number of ways. In one exemplary implementation, a regularly spaced control point grid with B-splines is used to define a warp from $B_{new}$ onto $B_a$. The warp consists of a set of transformations $T_i$, with one transformation for each control point in the control point grid. The warp is then used to define a parameterization of shape. By concatenating together a sufficient number of warps and shape parameterizations for the set of breast silhouettes used by baseline shape unit 210, statistics parameters for an active shape model can be extracted. Shape parameterization unit 220 may perform non-rigid registration using techniques discussed in "Automatic Construction of 3-D Statistical Deformation Models of the Brain Using Nonrigid Registration", by D. Rueckert, A. Frangi and J. Schnabel, IEEE Transactions on Medical Imaging, 22(8), p. 1014-1025, August 2003, the entire contents of which are hereby incorporated by reference. In the publication listed above, a non-rigid registration algorithm is used to establish correspondences between shapes. Because anatomical variability between shapes cannot typically be sufficiently explained by an affine transformation, non-rigid transformations such as elastic or fluid transformations can be used. The non-rigid transformations can be expressed as local transformations, which describe non-affine variability between shapes. A combined transformation T between shapes is then the sum of a global (affine) transformation, and a local (non-rigid) transformation: $T(x)=T_{global}(x)+T_{local}(x)$. B-splines can be used to model deformable shapes, by manipulating an underlying mesh of control points. The lattice of control points is defined as a grid with uniform spacing, which is placed on the underlying reference image, such as, for example, a baseline breast atlas shape $B_a$. Optimal transformations may then be found using a gradient descent minimization of a cost function associated with the global transformation parameters (i.e., describe affine transformations between shapes) as well as local transformation parameters. The resulting transformation T maps each point in a reference shape, such as a baseline breast atlas shape $B_a$, to the corresponding point in a subject shape, such as a breast silhouette $B_{new}$.

The set of warped control points $P_{new}$ together with the center of mass $C_{new}$ provides sufficient specificity to describe matches between pixels of two registered breast silhouettes. Other sets of parameters may also be used to define shapes for breast silhouettes $B_{new}$. For example, other parameters derived from warped control points $P_{new}$, and parameters different from the center of mass $C_{new}$ may be used to define the shape of $B_{new}$.

Shape parameterization unit 220 performs shape parameterization for the breast silhouettes from the set of breast silhouettes used by baseline shape unit 210, and outputs shape representations $S_i=(P_{new\_i}, C_{new\_i})$ for all the processed breast silhouettes $B_{new\_i}$ (S513, S515, S517). Shape parameterization unit 220 may perform shape parameterization for breast silhouettes of different views, from the set of breast silhouettes used by baseline shape unit 210, and output shape representations (S519, S521).

Figure 9A:
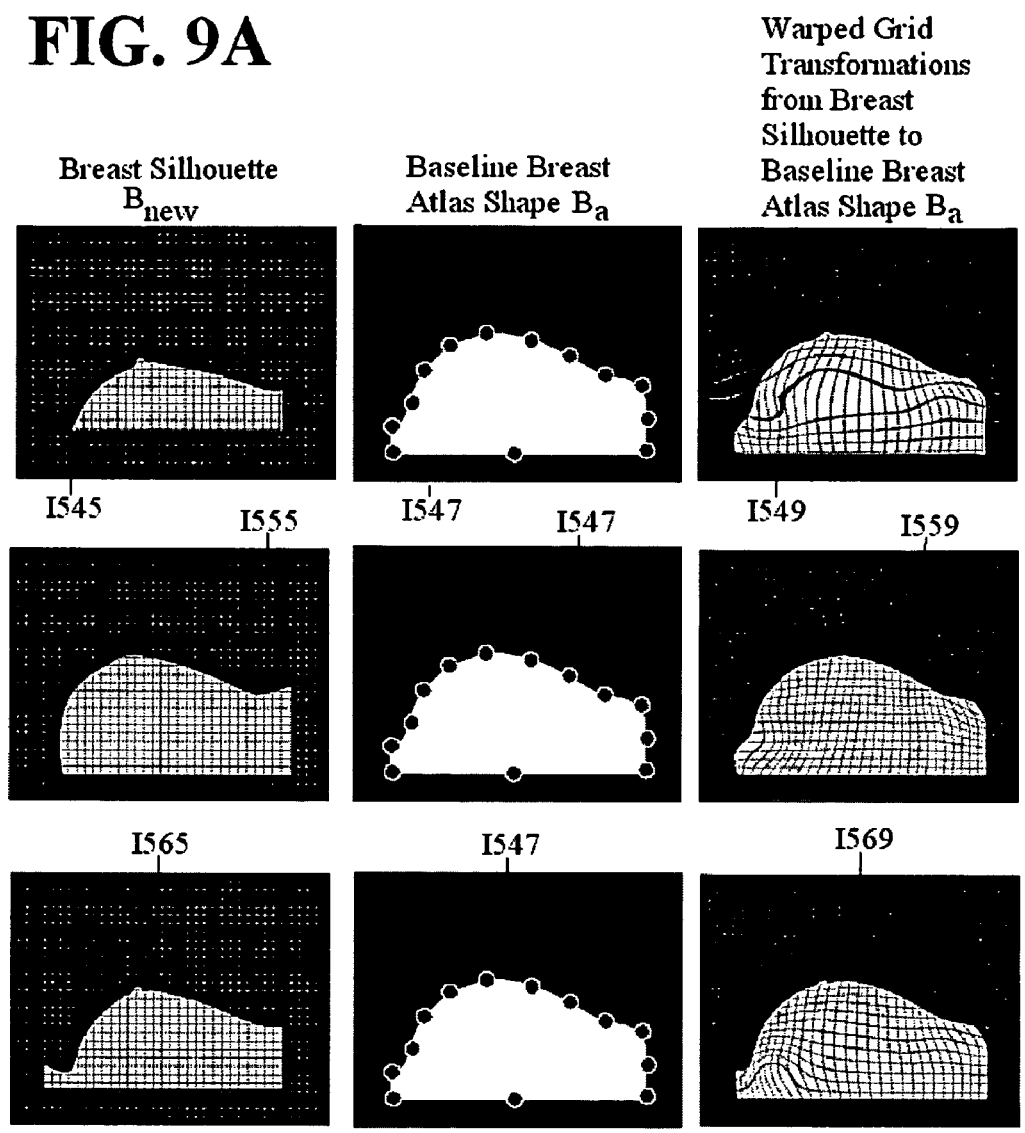
FIG. 9A illustrates exemplary aspects of the operation of warping a breast silhouette onto a baseline mean breast shape according to an embodiment of the present invention illustrated in FIG. 8.

FIG. 9A illustrates exemplary aspects of the operation of warping a breast silhouette onto a baseline mean breast shape according to an embodiment of the present invention illustrated in FIG. 8. Landmarks are placed upon the baseline breast atlas shape $B_a$ I547. Grids are defined onto a training set of breast silhouettes $B_{new}$ I545, I555, and I565. Using non-rigid registration, the grids are warped onto the baseline breast atlas shape $B_a$ I547, so that the breast silhouettes $B_{new}$ I545, I555, and I565 are aligned with the baseline breast atlas shape $B_a$ I547 through a series of non-rigid transformations. The grids warped onto the baseline breast atlas shape $B_a$ I547 are shown in images I549, I559, and I569.

Figure 9B:
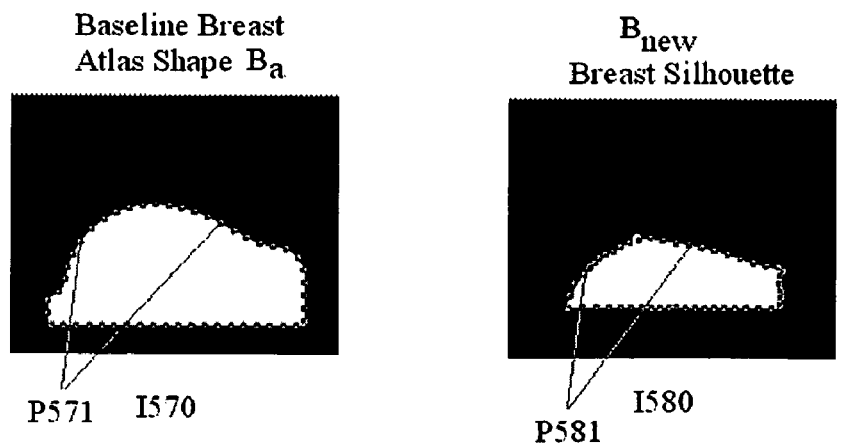
FIG. 9B illustrates an exemplary result of the operation of performing shape parameterization for a breast silhouette according to an embodiment of the present invention illustrated in FIG. 8.

FIG. 9B illustrates an exemplary result of the operation of performing shape parameterization for a breast silhouette according to an embodiment of the present invention illustrated in FIG. 8. Control grid points $P=[(x_1, y_1) (x_2, y_2) \ldots (x_n, y_n)]$ P571 are placed along the edges of the baseline breast atlas shape $B_a$ I570. The control points are then warped onto a breast silhouette $B_{new}$ I580 by reversing the corresponding non-rigid transformation obtained as described in FIG. 9A. Corresponding control points $P_{new}$ P581 are obtained. The shape representation for the breast in image I580 may then be determined by the warped control points $P_{new}$ P581, and the center of mass of the breast shape enclosed by the warped control points $P_{new}$ P581.

Figure 10:
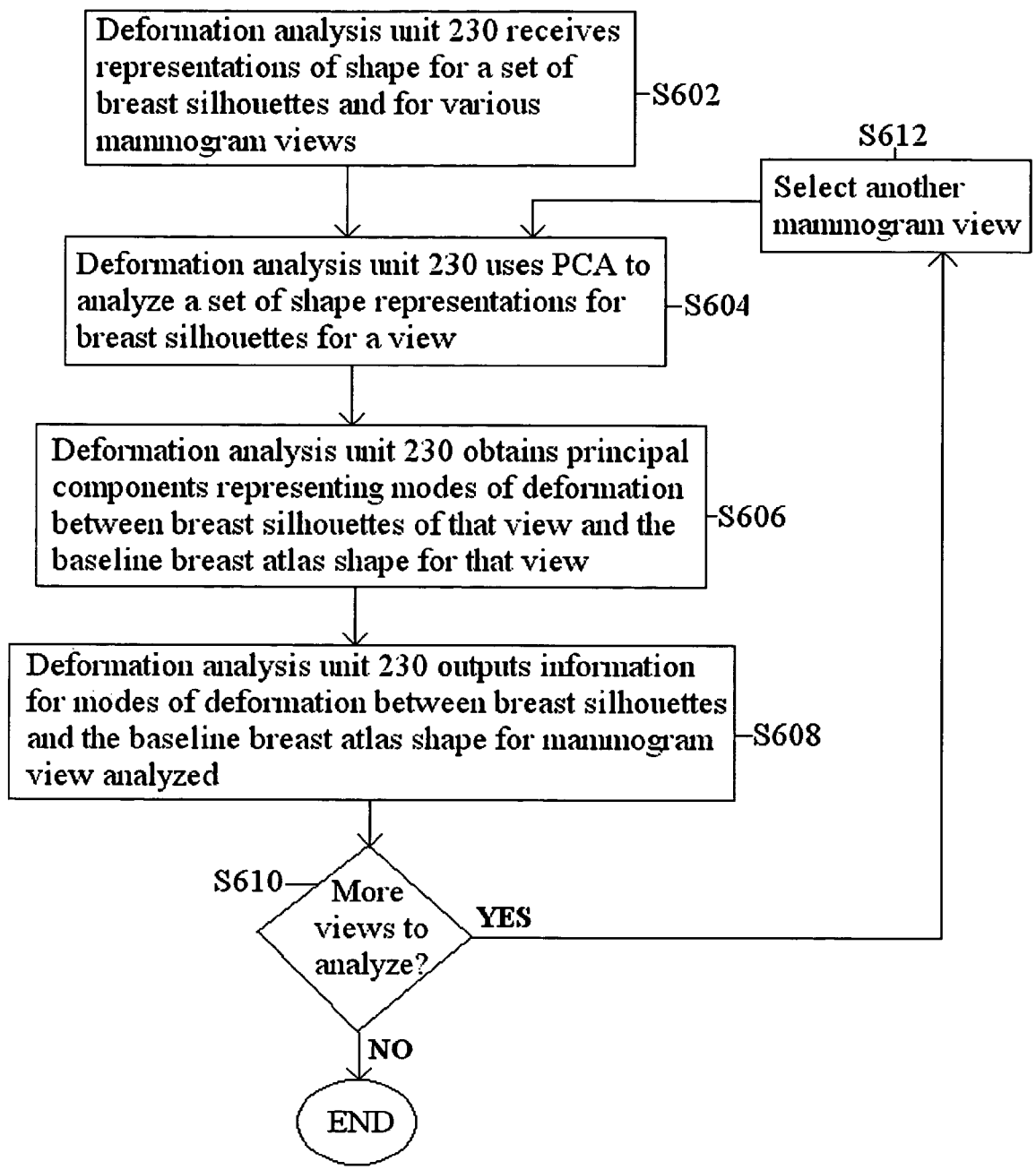
FIG. 10 is a flow diagram illustrating operations performed by a deformation analysis unit included in an image processing unit for generating a probabilistic atlas using shape modeling according to an embodiment of the present invention illustrated in FIG. 3.

FIG. 10 is a flow diagram illustrating operations performed by a deformation analysis unit 230 included in an image processing unit 31A for generating a probabilistic atlas using shape modeling according to an embodiment of the present invention illustrated in FIG. 3. The flow diagram illustrated in FIG. 10 describes exemplary details of step S309 from FIG. 4.

Deformation analysis unit 230 receives representations of shape $S_i=(P_{new\_i}, C_{new\_i})$ for a set of breast silhouettes $B_{new\_i}$ and for various mammogram views. (S602). For each view of mammograms, deformation analysis unit 230 finds the principal modes of deformation between breast silhouettes $B_{new\_i}$ of that view and the baseline breast atlas shape $B_a$ for that view.

Deformation analysis unit 230 may use Principal Components Analysis (PCA) techniques to find the principal modes of deformation. With these modes of deformation, it is then possible to shape-constrain an optimization process to fit a breast contour to a new breast image.

The breast silhouettes of one mammogram view are analyzed at a time. The dataset analyzed is the set of shape representations for breast silhouettes for a view (S604). The principal components obtained from PCA represent modes of deformation between breast silhouettes $B_{new\_i}$ of that view and the baseline breast atlas shape $B_a$ for that view (S606).

Deformation analysis unit 230 then outputs information for the modes of deformation between breast silhouettes $B_{new\_i}$ and the baseline breast atlas shape $B_a$, for each mammogram view analyzed (S608, S610, S612).

FIG. 11A illustrates exemplary deformation modes obtained by a deformation analysis unit 230 according to an embodiment of the present invention illustrated in FIG. 10. The breast shape in figure I630 is the baseline breast atlas shape (mean shape) for the ML view.

The first 3 modes (L1, L2, L3) of deformation are shown. The first mode of deformation is L1. Contours D2 and D3 define the deformation mode L1. The deformation mode L1 can be represented by directions and proportional length of movement for each contour point from the D2 contour to a corresponding contour point from the D3 contour. Contours D4 and D5 define the second deformation mode L2, and contours D6 and D7 define the third deformation mode L3. As it can be seen in FIG. 11A, the first deformation mode L1 corresponds roughly to changes in breast size, the second deformation mode L2 corresponds roughly to changes in length, and third deformation mode L3 corresponds roughly to changes in the general shape.

Figure 11B:
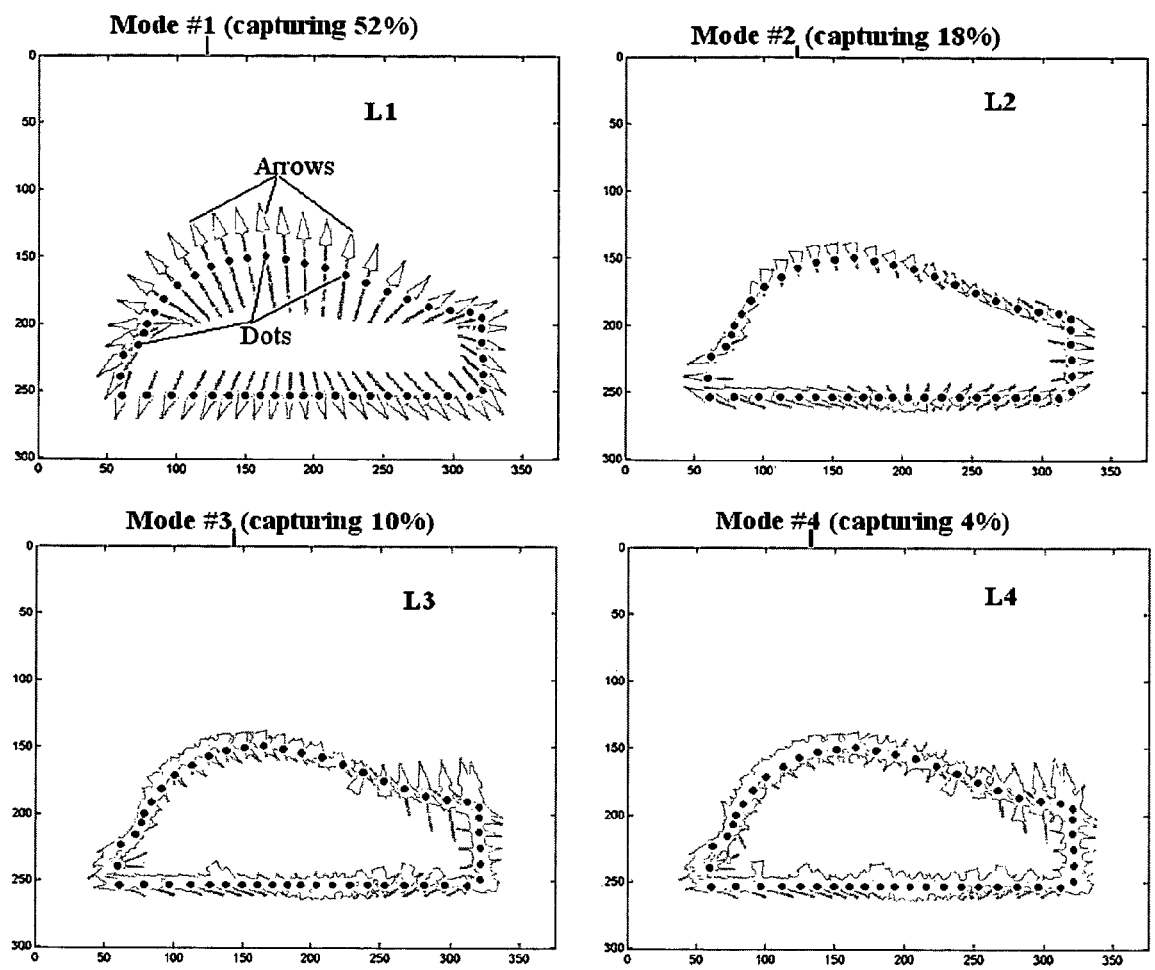
FIG. 11B illustrates another set of exemplary deformation modes obtained by a deformation analysis unit according to an embodiment of the present invention illustrated in FIG. 10.

FIG. 11B illustrates another set of exemplary deformation modes obtained by a deformation analysis unit 230 according to an embodiment of the present invention illustrated in FIG. 10. To obtain FIG. 11B, a shape model was trained using 4900 breast images of ML view. 17 deformation modes, capturing 99% of the variance in the breast images data set, were obtained. The representations of the first 4 modes L1, L2, L3 and L4 are shown in FIG. 11B. The representations of the first 4 modes L1, L2, L3 and L4, shown in FIG. 11B, together capture 85% of the data's variance. For each mode shown in FIG. 11B, the mean breast shape (baseline breast atlas shape) for the ML view is plotted with dots (points), while the arrows represent the distance traveled by one point for that mode from −2 standard deviations to +2 standard deviations of the mean breast shape. Mode L1 captures 52% of the variance in the breast images data set, mode L2 captures 18% of the variance in the breast images data set, mode L3 captures 10% of the variance in the breast images data set, and mode L4 captures 4% of the variance in the breast images data set. The rest of the deformation modes (L5 to L17) are not shown.

The baseline breast atlas shape $B_a$ for a mammogram view, and the modes of deformation between breast silhouettes $B_{new\_i}$ and the baseline breast atlas shape $B_a$ define a shape model for that mammogram view.

The baseline breast atlas shape (mean shape) data includes: coordinates of the center of mass for the baseline breast atlas shape (mean shape); standard deviation of the mean shape; and list of the n control points $P=[(x_1, y_1)(x_2, y_2)\ldots(x_n, y_n)]$ for the mean shape. In one exemplary implementation, the standard deviation of the mean shape is chosen as zero.

The mode data includes data for each deformation mode obtained. The data for each deformation mode obtained includes: coordinates of the center of mass of that mode; standard deviation of that mode; and list of deformations (displacements) for that mode, as applied to the n control points $P=[(x_1, y_1)(x_2, y_2)\ldots(x_n, y_n)]$.

Figure 12:
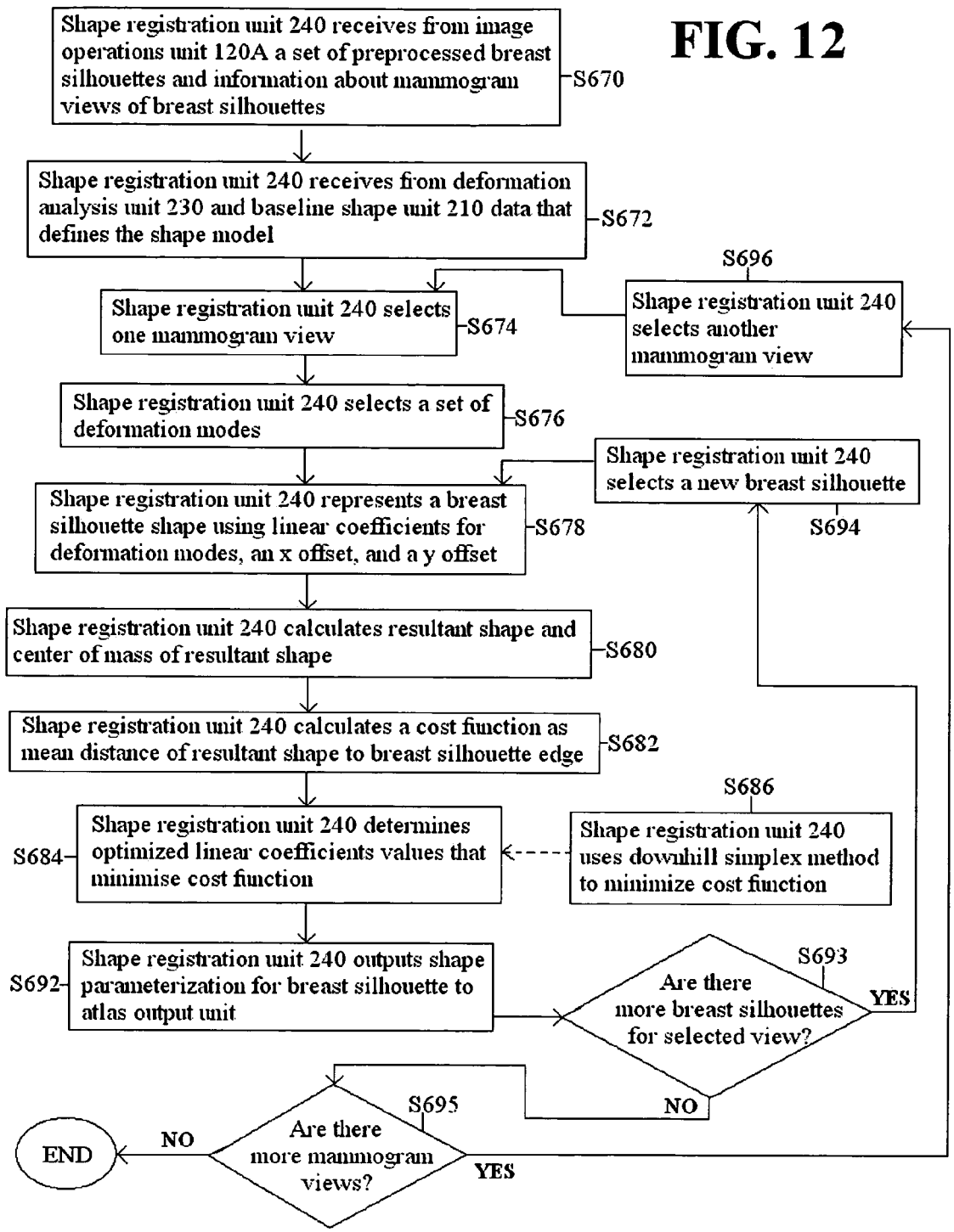
FIG. 12 is a flow diagram illustrating operations performed by a shape registration unit included in an image processing unit for generating a probabilistic atlas using shape modeling according to an embodiment of the present invention illustrated in FIG. 3.

FIG. 12 is a flow diagram illustrating operations performed by a shape registration unit 240 included in an image processing unit 31A for generating a probabilistic atlas using shape modeling according to an embodiment of the present invention illustrated in FIG. 3. The flow diagram illustrated in FIG. 12 describes exemplary details of steps S313, S311, S315, and S317 from FIG. 4.

Shape registration unit 240 receives from image operations unit 120A a set of preprocessed breast images, represented as breast silhouettes (S670). Information about the mammogram views of the breast images is also received (S670). The set of breast silhouettes may be, for example, a set of images containing a biopsy-proven cancerous mass. The set of breast silhouettes may be a subset of the set of breast images previously used to generate the shape model.

Shape registration unit 240 also receives from deformation analysis unit 230 and baseline shape unit 210 data that defines the shape model, including data for deformation modes and for the baseline breast atlas shape (mean shape) for each mammogram view analyzed (S672).

Shape registration unit 240 selects one mammogram view (S674). For that mammogram view, shape registration unit 240 selects the first k deformation modes that explain a large amount of the variance in the dataset of breast silhouettes for that view (S676). In one exemplary implementation, shape registration unit 240 selects the first k deformation modes that explain 99.9% of the variance in the dataset of breast silhouettes for that view. Shape registration unit 240 then fits any new breast silhouette from the breast silhouette dataset, with its correct shape representation.

Any new breast silhouette $B_{new}$ can be matched to the baseline breast atlas shape using the shape model, which restricts the search space of possible shapes to only those breast shapes that are probable. Shape registration unit 240 fits any new breast silhouette $B_{new}$ with its correct shape representation that is a linear combination of the principal modes of shape variation (deformation modes), using the following relationship:

$$\text{Shape for } B_{new} = p + \text{Baseline Breast Atlas Shape} + \sum_{i=1}^{k} \alpha_i L_i \quad (1)$$

where the "Baseline Breast Atlas Shape" is the baseline shape (such as, for example, a mean breast shape) corresponding to the view of breast silhouette $B_{new}$, p is an offset (such as a 2D offset) to the baseline breast atlas shape to account for a rigid translation of the entire shape, $L_i$, i=1 . . . k is the set of the first k deformation modes that explain a large amount (for example, 99.9% in an exemplary implementation) of the variance in the dataset of breast silhouettes, and $\alpha_i$, i=1 . . . k define the deviations of Shape from the baseline breast atlas shape along the axes associated with the principal deformation modes $L_i$. The number of modes k may be pre-selected based on how much variance in the training set is explained by the first k modes. The free parameters in the expression (1) above are p=($p_x$, $p_y$) and $\alpha_i$, i=1 . . . k. The 2D offset p=($p_x$, $p_y$) allows for a translational alignment of the centers of mass, in addition to local shape variations. An optimization is performed over the k+2 free parameters p=($p_x$, $p_y$) and $\alpha_i$, i=1 . . . k, to find the optimal matching breast silhouette for any given input $B_{new}$.

Hence, to fit the breast silhouette $B_{new}$ with its correct shape representation, shape registration unit 240 optimizes the $\alpha_i$ values, together with the x offset $p_x$ and they offset $p_y$, for a total of k+2 parameters: ($p_x$, $p_y$, $\alpha$) (S678), where $\alpha=\alpha_1$, $\alpha_2$, . . . , $\alpha_k$. For optimization, shape registration unit 240 uses a cost function defined as the mean distance to edge. For a ($p_x$, $p_y$, $\alpha$) parameter set, shape registration unit 240 calculates the new shape (Shape) resulting from these parameters by formula (1)

$$\text{Shape} = p + \text{Baseline Breast Atlas Shape} + \sum_{i=1}^{k} \alpha_i L_i \quad (680).$$

The center of mass of the new shape (Shape.COM) is then calculated (S680). For each shape point on the exterior (border) of Shape, shape registration unit 240 calculates how far the shape point is from the edge of breast silhouette $B_{new}$, as further illustrated in FIG. 13A. The mean distance for the Shape points to the edge of breast silhouette $B_{new}$ is then calculated (S682). Optimized $\alpha_i$ and ($p_x$, $p_y$) values are selected for which this mean distance attains a minimum (S684).

Shape registration unit 240 may use the downhill simplex method, also known as the Nelder-Mead or the amoeba algorithm (S686), to fit a new breast silhouette $B_{new}$ with its correct shape representation, by minimizing distances of contour points of Shape to the breast silhouette $B_{new}$ edge. The downhill simplex method is a single-valued minimization algorithm that does not require derivatives. The downhill simplex algorithm is typically very robust.

With the Nelder-Mead method, the k+2 parameters ($p_x$, $p_y$, $\alpha$) form a simplex in a multi-dimensional space. The Nelder-Mead method minimizes the selected cost function, by moving points of the simplex to decrease the cost function. A point of the simplex may be moved by reflections against a plane generated by the other simplex points, reflection and expansion of the simplex obtained after reflection, contraction of the simplex, etc.

Shape registration unit 240 optimizes parameters of the shape model for each new breast silhouette in the dataset, to optimally describe each new breast silhouette using the shape model (S693, S694). The optimization is performed for sets of breast silhouettes for each mammogram view analyzed (S695, S696). Shape registration unit 240 outputs the obtained shape parameterizations for breast silhouettes to atlas output unit 250 (S692).

Figure 13A:
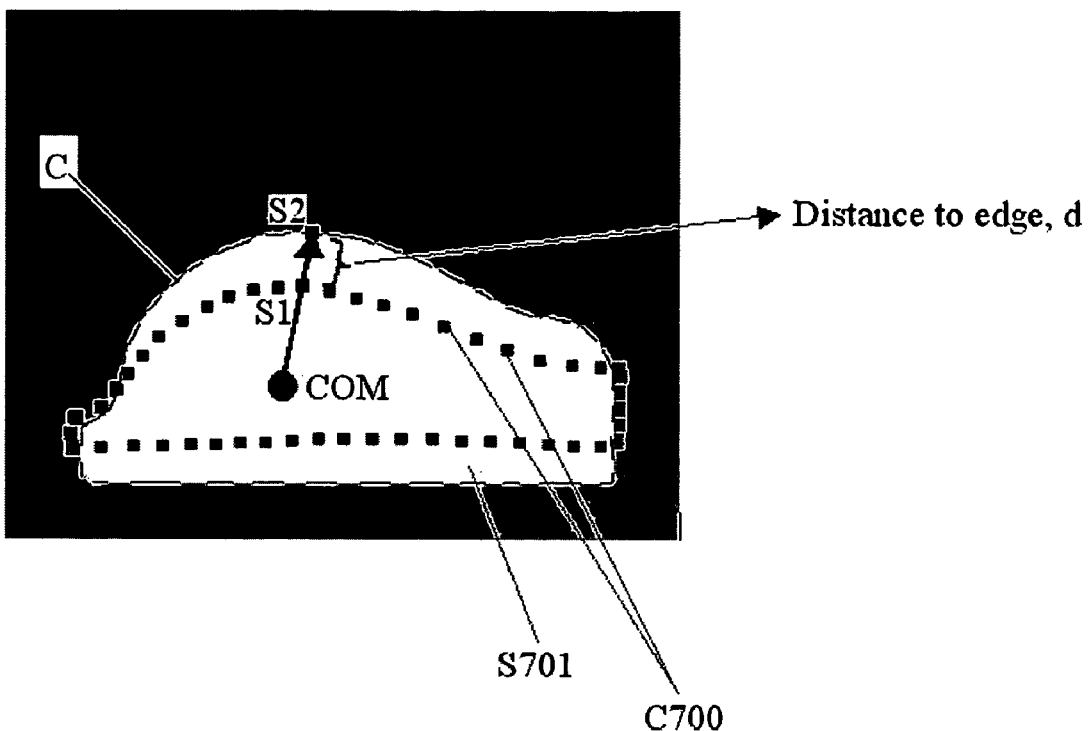
FIG. 13A illustrates exemplary aspects of the operation of calculating a cost function for a registered shape according to an embodiment of the present invention illustrated in FIG. 12.

FIG. 13A illustrates exemplary aspects of the operation of calculating a cost function for a registered shape according to an embodiment of the present invention illustrated in FIG. 12.

Given a new breast silhouette $B_{new}$ S701, a chain code (C) is defined around its perimeter. Shape registration is performed for the breast silhouette $B_{new}$ S701 using an $\alpha_i$, i=1 . . . k and ($p_x$, $p_y$) parameter set. A shape bounded by contour points C700 is obtained from formula (1) for $$\text{Shape for } B_{new} = p + \text{Baseline Breast Atlas Shape} + \sum_{i=1}^{k} \alpha_i L_i.$$

The center of mass COM for the Shape bounded by contour points C700 is found. For each point S1 on the contour (exterior) of Shape, a line is drawn through the COM point. The line intersects the contour (chain code C) of breast silhouette $B_{new}$ S701 at point S2. The distance to edge is the distance d between points S1 and S2. Distances d are obtained in this manner for all points on the contour (exterior) C700 of Shape. The full cost function is then obtained as the sum of all distances d, or as the mean of all distances d.

During the optimization, one more constraint may be added. During the PCA analysis performed by deformation analysis unit 230, the standard deviations of the principal deformation modes are also obtained. The search for $\alpha_i$, i=1 . . . k during optimization can be constrained such that $|\alpha_i| < \sqrt{3}\sigma_i$, where $\sigma_i$ is a standard deviation associated with deformation mode $L_i$. These extra constraints restrict the search space more stringently, so that the optimization algorithm looks only at probable breast shapes.

Figure 13B:
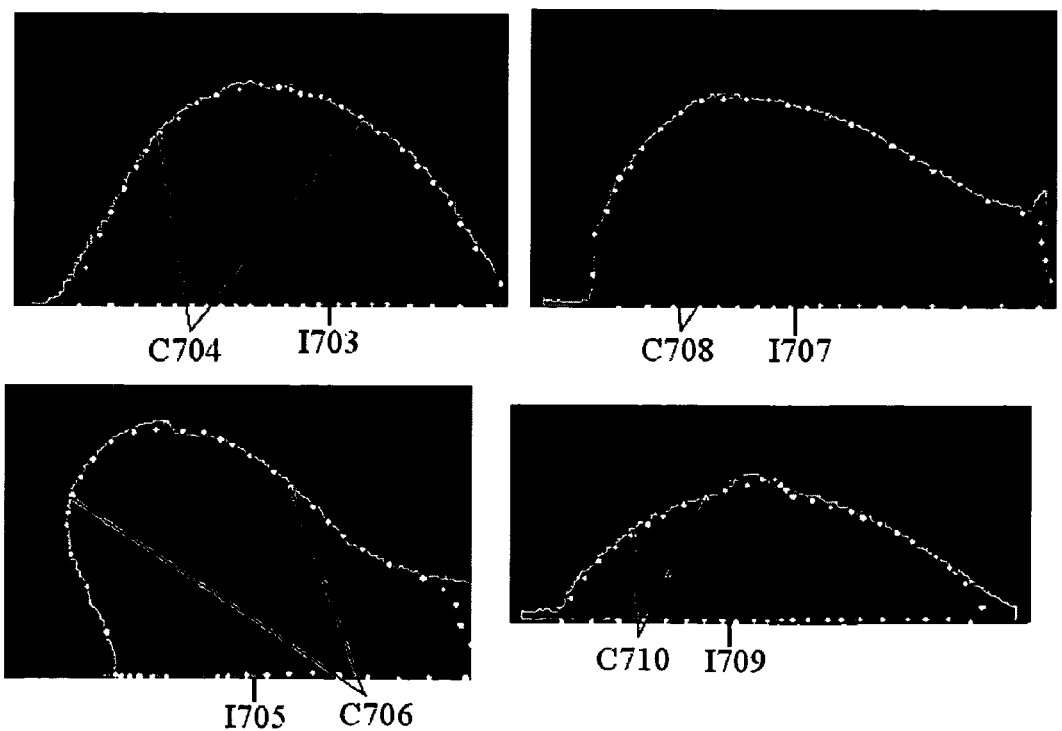
FIG. 13B illustrates exemplary results of the operation of performing shape registration for a breast silhouette according to an embodiment of the present invention illustrated in FIG. 12.

FIG. 13B illustrates exemplary results of the operation of performing shape registration for a breast silhouette according to an embodiment of the present invention illustrated in FIG. 12. As shown in FIG. 13B, breast silhouettes I703, I705, I707, and I709 are fit with shape representations. The shape registration results bounded by contours C704, C706, C708 and C710 are effectively describing the shapes of breast silhouettes I703, I705, I707, and I709. The downhill simplex algorithm was used to obtain the shape registration results shown in FIG. 13B.

FIG. 14 is a flow diagram illustrating operations performed by an atlas output unit 250 included in an image processing unit 31A for generating a probabilistic atlas using shape modeling according to an embodiment of the present invention illustrated in FIG. 3.

Atlas output unit 250 receives from shape registration unit 240 results of shape registration for the set of breast silhouettes analyzed (S730). The shape of each breast silhouette $B_{new}$ has been registered by shape registration unit 240 according to formula (1):

$$\text{Shape for } B_{new} = p + \text{Baseline Breast Atlas Shape} + \sum_{i=1}^{k} \alpha_i L_i.$$

The set of breast images corresponding to the breast silhouettes $B_{new}$ have features $F_i$ that have been previously localized. For example, the set of breast images may exhibit features such as malignant tumor formations that were previously localized by a radiology specialist and were biopsy proven. The locations of the features $F_i$ on the breast images are saved as image meta-information, in a data structure.

For a given view, suppose that a breast image $S_i$ includes a previously localized feature $F_i$, as recorded in a meta-information data structure. Using shape registration results from the shape model for the breast silhouettes $B_{new}$ corresponding to the breast images $S_i$ (S733), and for the baseline breast atlas shape (mean breast shape) $B_a$ obtained by baseline shape unit 210 (S734), the localized feature $F_i$ is mapped from the breast image $S_i$, to the mean breast shape $B_a$ (S736). This procedure is performed for all registered breast silhouettes (S744, S746), so that all previously localized features $F_i$ are mapped to the mean breast shape $B_a$. An atlas is created with the frequencies of locations of the features in the mean breast shape $B_a$ (S738). The atlas can then be normalized, to show probabilities (P) of features:

$$P = \frac{\text{frequencies}}{\text{\# total images}}.$$

Since a large number of breast images with previously localized features are used, the atlas is a probabilistic atlas that gives the probability of features appearing in various areas of the mean breast shape $B_a$.

One probabilistic atlas of features may be generated for each symmetric mammogram view (S740, S748). For example, a probabilistic atlas of features may be generated for the ML view using breast images of the mirror MLL and MLR views, and another probabilistic atlas may be generated for the CC view using breast images of the mirror CCL and CCR views. Standard deviation values for breast silhouette shapes may be used when generating the probabilistic atlases. In an exemplary implementation, standard deviation values between 2.0 and 5.0 for breast silhouette shapes were used.

For each view analyzed, atlas output unit 250 outputs probabilistic atlases containing the probability of feature locations for each pixel value inside the mean atlas shape for that view (S742).

In an exemplary implementation, the features analyzed are cancer masses. The set of training breast silhouettes have cancer masses that have been previously localized. Probabilistic atlases containing the probability of cancer for each pixel value inside the mean breast shape, are obtained for various mammogram views.

Atlas output unit 250 may output the probabilistic atlas results to image output unit 51, printing unit 41, and/or display 61.

Figure 15A:
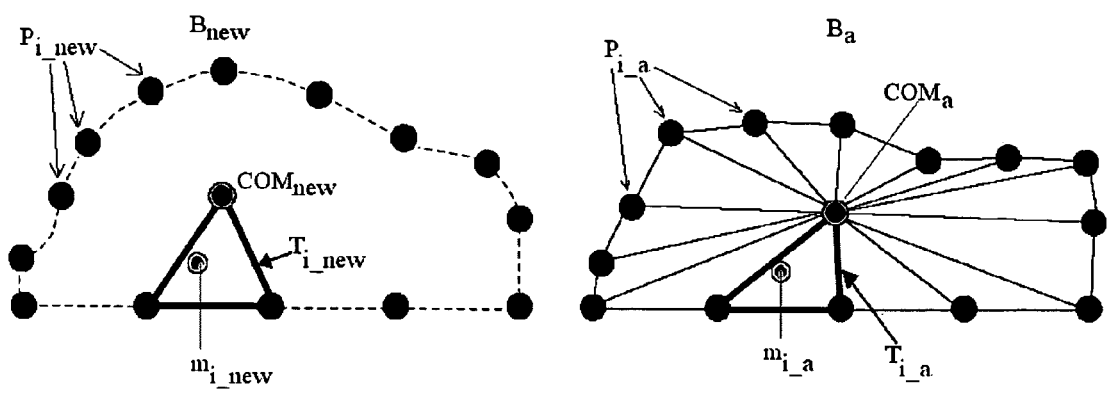
FIG. 15A illustrates exemplary aspects of the operation of mapping pixels from one breast image to another according to an embodiment of the present invention illustrated in FIG. 14.

FIG. 15A illustrates exemplary aspects of the operation of mapping pixels from one breast image to another according to an embodiment of the present invention illustrated in FIG. 14. To bring individual pixels inside one breast shape ($B_{new}$) into correspondence with another breast shape (for example, with baseline breast atlas shape $B_a$), $B_{new}$ is parameterized and a chain code of points $P_{i\_new}$ is located around its perimeter. The parameterization of $B_{new}$ establishes a correspondence between the points $P_{i\_new}$ and a chain code of points $P_{i\_a}$ on the perimeter of the baseline breast atlas shape $B_a$. The centers of mass $COM_{new}$ and $COM_a$ of the breast shape $B_{new}$ and the baseline breast atlas shape $B_a$ are also corresponding points. Hence, all pixels within the contour of $B_{new}$ are mapped into the pixels of the contour of $B_a$, and $COM_{new}$ is mapped to $COM_a$.

The breast shape $B_{new}$ is divided into triangular meshes using the center of mass and chain code points. Given a point $m_{i\_new}$ inside the breast shape $B_{new}$, a mesh triangle $T_{i\_new}$ is identified that contains $m_{i\_new}$. The equivalent of the mesh triangle $T_{i\_new}$ is identified in the baseline breast atlas shape $B_a$, as the triangle $T_{i\_a}$. Next, point $m_{i\_new}$ is mapped into its corresponding point $m_{i\_a}$ in the new mesh triangle $T_{i\_a}$, using bilinear interpolation of the vertices of the corresponding triangles $T_{i\_new}$ and $T_{i\_a}$.

Figure 15B:
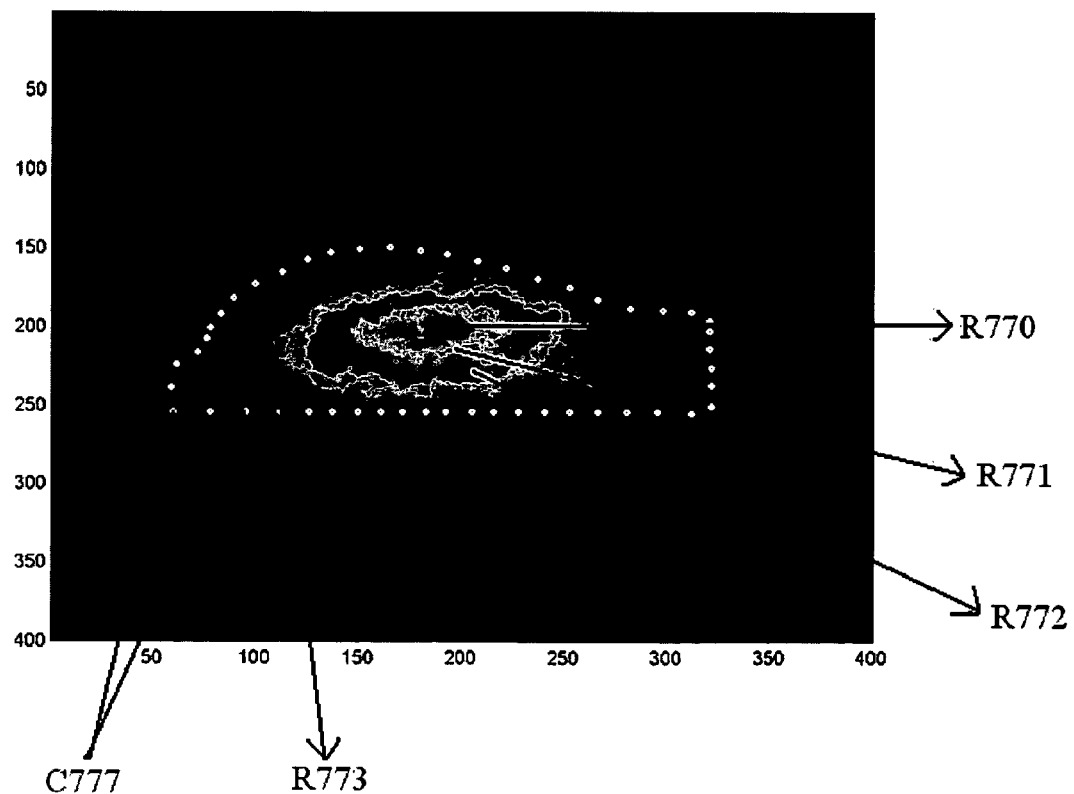
FIG. 15B illustrates an exemplary ML view probabilistic atlas for probability of cancer in breasts obtained by an atlas output unit according to an embodiment of the present invention illustrated in FIG. 14.

FIG. 15B illustrates an exemplary ML view probabilistic atlas for probability of cancer in breasts obtained by an atlas output unit 250 according to an embodiment of the present invention illustrated in FIG. 14. The probabilistic atlas may be viewed in color, with each pixel colored according to the probability for presence of cancer at that pixel. For the ML view probabilistic atlas in FIG. 15A, the contour C777 is the contour of the mean breast shape $B_a$ for the ML view. The region R770 indicates the highest probability of cancer, followed by regions R771, then R772, and R773. As shown in the probabilistic atlas, the probability for cancer is largest in the center of a breast, and decreases towards edges of the mean breast shape.

Figure 15C:
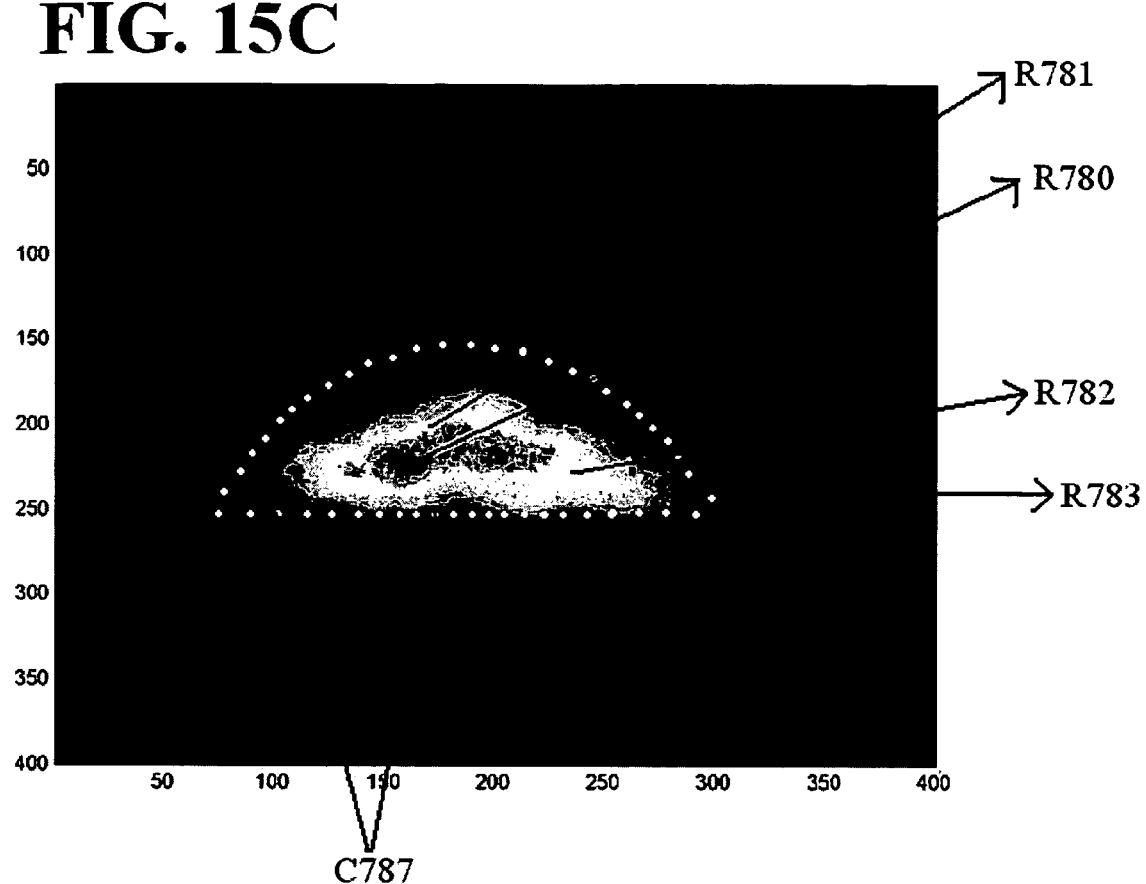
FIG. 15C illustrates an exemplary CC view probabilistic atlas for probability of cancer in breasts obtained by an atlas output unit according to an embodiment of the present invention illustrated in FIG. 14.

FIG. 15C illustrates an exemplary CC view probabilistic atlas for probability of cancer in breasts obtained by an atlas output unit 250 according to an embodiment of the present invention illustrated in FIG. 14. The probabilistic atlas may be viewed in color, with each pixel colored according to the probability for presence of cancer at that pixel. For the CC view probabilistic atlas in FIG. 15B, the contour C787 is the contour of the mean breast shape for the CC view. The region R780 indicates the highest probability of cancer, followed by regions R781, then R782, and R783. As shown in the probabilistic atlas, the probability for cancer is largest in the center left region of a breast, and decreases towards edges of the mean breast shape.

The current application characterizes breast shapes; defines a baseline breast shape for each mammogram view; calculates deformation fields that warp baseline breast shapes to new breasts and vice versa; obtains a shape model for breast shapes; and, for each view, generates a probabilistic atlas containing the probability of feature locations for each pixel value inside the mean atlas shape for that view. The shape model enables comparison of high-level shapes of two distinct breasts and generation of probabilistic atlases with breast features. The probabilistic atlases account for shape variations of a mammogram view. In an exemplary implementation, a probabilistic breast cancer atlas is generated as a map of the likelihood of cancer on the mean breast shape. Information from the probabilistic atlas can be extremely useful in computer-aided detection of breast features such as cancer. Hence, probabilistic atlases of features and shape models associated with breast shapes are useful for automatic detection of cancer in breasts.

Although detailed embodiments and implementations of the present invention have been described in the context of mammography images, embodiments and implementations of the present invention are equally applicable to other anatomical objects besides breasts, to generate probabilistic atlases for features found in anatomical objects. Embodiments and implementations of the present invention are also equally applicable to other objects besides anatomical objects, to generate probabilistic atlases for features found in objects.

Although detailed embodiments and implementations of the present invention have been described above, it should be apparent that various modifications are possible without departing from the spirit and scope of the present invention.

I claim:

1. An image processing method of using an image processing unit to generate a probabilistic atlas, said method comprising:
   accessing digital image data representing a plurality of objects with a plurality of features;
   generating a shape model using a shape model unit for shapes of said plurality of objects, said step of generating a shape model including generating a baseline object using a baseline shape unit by aligning said plurality of objects, and determining deformation modes using a deformation analysis unit to describe shape deformations between shapes of said plurality of objects and said baseline object;

performing shape registration using a shape registration unit for said plurality of objects by fitting shapes of said plurality of objects using combinations of said deformation modes, to obtain registered shapes;

generating a probabilistic atlas of a map of probabilities of features on a mean shape using a probabilistic atlas generation unit by mapping said plurality of features from said plurality of objects to said baseline object, using said registered shapes for said plurality of objects and outputting the probabilistic atlas to an output unit to obtain probabilities; and wherein said sub-step of generating the baseline object generates said baseline object as a mean object shape by aligning centers of mass of shapes of said plurality of objects to obtain a map of pixel frequencies in said shapes of said plurality of objects, and thresholding said map of pixel frequencies at a predetermined frequency to obtain the mean object shape.

2. The image processing method as recited in claim 1, further comprising:

obtaining said shapes of said plurality of objects by detecting clusters of pixels belonging to said plurality of objects.

3. The image processing method as recited in claim 1, wherein said sub-step of determining the deformation modes includes placing control points on edges of said baseline object, generating a deformation grid using said control points, warping said control points from said baseline object to said shapes of said plurality of objects using said deformation grid to obtain warped control points, obtaining shape parameterizations for said shapes of said plurality of objects using said warped control points, and extracting deformation modes using said shape parameterizations.

4. The image processing method as recited in claim 3, wherein said step of warping said control points is performed using non-rigid registration.

5. The image processing method as recited in claim 3, wherein said sub-step of extracting the deformation modes using said shape parameterizations uses Principal Component Analysis for set of said shape parameterizations, to obtain said deformation modes as principal components.

6. The image processing method as recited in claim 1, wherein said performing shape registration step fits said shapes of said plurality of objects to linear combinations of said deformation modes, by optimizing linear coefficients of said deformation modes.

7. The image processing method as recited in claim 1, wherein said plurality of objects are breasts, said plurality of features are cancer structures in said breasts, and said probabilistic atlas stores probabilities for said cancer structures at pixels in said baseline object.

8. The image processing method as recited in claim 1, wherein said plurality of objects are anatomical objects, said plurality of features are anatomical structures, and said probabilistic atlas stores probabilities for said anatomical structures at pixels in said baseline object.

9. The image processing method as recited in claim 1, wherein said probabilistic atlas stores probabilities for presence of said features at pixels in said baseline object.

10. An image processing apparatus, said apparatus comprising:

an image data input unit for providing digital image data representing a plurality of objects with a plurality of features;

a shape model unit for generating a shape model for shapes of said plurality of objects, said shape model unit generating a shape model by generating a baseline object by aligning said plurality of objects, and determining deformation modes to describe shape deformations between shapes of said plurality of objects and said baseline object;

a shape registration unit for performing shape registration for said plurality of objects by fitting shapes of said plurality of objects using combinations of said deformation modes, to obtain registered shapes;

a probabilistic atlas unit for generating a probabilistic atlas of a map of probabilities of features on a mean shape by mapping said plurality of features from said plurality of objects to said baseline object, using said registered shapes for said plurality of objects; and wherein said shape model unit generates said baseline object as a mean object shape by aligning centers of mass of shapes of said plurality of objects to obtain a map of pixel frequencies in said shapes of said plurality of objects, and thresholding said map of pixel frequencies at a predetermined frequency to obtain the mean object shape.

11. The apparatus according to claim 10, further comprising:

a preprocessing unit for obtaining said shapes of said plurality of objects by detecting clusters of pixels belonging to said plurality of objects.

12. The apparatus according to claim 10, wherein said shape model unit determines the deformation modes by placing control points on edges of said baseline object, generating a deformation grid using said control points, warping said control points from said baseline object to said shapes of said plurality of objects using said deformation grid to obtain warped control points, obtaining shape parameterizations for said shapes of said plurality of objects using said warped control points, and extracting deformation modes using said shape parameterizations.

13. The apparatus according to claim 12, wherein said shape model unit warps said control points using non-rigid registration.

14. The apparatus according to claim 12, wherein said shape model unit extracts said deformation modes by using Principal Component Analysis for set of said shape parameterizations, to obtain said deformation modes as principal components.

15. The apparatus according to claim 10, wherein said shape registration unit fits said shapes of said plurality of objects to linear combinations of said deformation modes, by optimizing linear coefficients of said deformation modes.

16. The apparatus according to claim 10, wherein said plurality of objects are breasts, said plurality of features are cancer structures in said breasts, and said probabilistic atlas stores probabilities for said cancer structures at pixels in said baseline object.

17. The apparatus according to claim 10, wherein said plurality of objects are anatomical objects, said plurality of features are anatomical structures, and said probabilistic atlas stores probabilities for said anatomical structures at pixels in said baseline object.

18. The apparatus according to claim 10, wherein said probabilistic atlas stores probabilities for presence of said features at pixels in said baseline object.

19. An image processing method of using an image processing unit to generate a probabilistic atlas, said method comprising:
- accessing digital image data representing a plurality of objects with a plurality of features;
- generating a shape model using a shape model unit for shapes of said plurality of objects, said step of generating a shape model including
  - generating a baseline object using a baseline shape unit by aligning said plurality of objects, and
  - determining deformation modes using a deformation analysis unit to describe shape deformations between shapes of said plurality of objects and said baseline object;
- performing shape registration using a shape registration unit for said plurality of objects by fitting shapes of said plurality of objects using combinations of said deformation modes, to obtain registered shapes; and
- generating a probabilistic atlas of a map of probabilities of features on a mean shape using a probabilistic atlas generation unit by mapping said plurality of features from said plurality of objects to said baseline object, using said registered shapes for said plurality of objects and outputting the probabilistic atlas to an output unit to obtain probabilities;
- wherein said performing shape registration step fits said shapes of said plurality of objects to linear combinations of said deformation modes, by optimizing linear coefficients of said deformation modes, and
- wherein said performing shape registration step optimizes said linear coefficients of said deformation modes using a downhill simplex method.

20. An image processing method of using an image processing unit to generate a probabilistic atlas, said method comprising:
- accessing digital image data representing a plurality of objects with a plurality of features;
- generating a shape model using a shape model unit for shapes of said plurality of objects, said step of generating a shape model including
  - generating a baseline object using a baseline shape unit by aligning said plurality of objects, and
  - determining deformation modes using a deformation analysis unit to describe shape deformations between shapes of said plurality of objects and said baseline object;
- performing shape registration using a shape registration unit for said plurality of objects by fitting shapes of said plurality of objects using combinations of said deformation modes, to obtain registered shapes; and
- generating a probabilistic atlas of a map of probabilities of features on a mean shape using a probabilistic atlas generation unit by mapping said plurality of features from said plurality of objects to said baseline object, using said registered shapes for said plurality of objects and outputting the probabilistic atlas to an output unit to obtain probabilities;
- wherein said performing shape registration step fits said shapes of said plurality of objects to linear combinations of said deformation modes, by optimizing linear coefficients of said deformation modes, and
- wherein said step of generating said probabilistic atlas maps said plurality of features to said baseline object by using said linear combinations of said deformation modes with said optimized linear coefficients.

21. An image processing apparatus, said apparatus comprising:
- an image data input unit for providing digital image data representing a plurality of objects with a plurality of features;
- a shape model unit for generating a shape model for shapes of said plurality of objects, said shape model unit generating a shape model by
  - generating a baseline object by aligning said plurality of objects, and
  - determining deformation modes to describe shape deformations between shapes of said plurality of objects and said baseline object;
- a shape registration unit for performing shape registration for said plurality of objects by fitting shapes of said plurality of objects using combinations of said deformation modes, to obtain registered shapes; and
- a probabilistic atlas unit for generating a probabilistic atlas of a map of probabilities of features on a mean shape by mapping said plurality of features from said plurality of objects to said baseline object, using said registered shapes for said plurality of objects;
- wherein said shape registration unit fits said shapes of said plurality of objects to linear combinations of said deformation modes, by optimizing linear coefficients of said deformation modes, and
- wherein said shape registration unit optimizes said linear coefficients of said deformation modes using a downhill simplex method.

22. An image processing apparatus, said apparatus comprising:
- an image data input unit for providing digital image data representing a plurality of objects with a plurality of features;
- a shape model unit for generating a shape model for shapes of said plurality of objects, said shape model unit generating a shape model by
  - generating a baseline object by aligning said plurality of objects, and
  - determining deformation modes to describe shape deformations between shapes of said plurality of objects and said baseline object;
- a shape registration unit for performing shape registration for said plurality of objects by fitting shapes of said plurality of objects using combinations of said deformation modes, to obtain registered shapes; and
- a probabilistic atlas unit for generating a probabilistic atlas of a map of probabilities of features on a mean shape by mapping said plurality of features from said plurality of objects to said baseline object, using said registered shapes for said plurality of objects;
- wherein said shape registration unit fits said shapes of said plurality of objects to linear combinations of said deformation modes, by optimizing linear coefficients of said deformation modes, and
- wherein said probabilistic atlas unit maps said plurality of features to said baseline object by using said linear combinations of said deformation modes with said optimized linear coefficients.

* * * * *